US011086682B2

(12) United States Patent
Uesaka

(10) Patent No.: US 11,086,682 B2
(45) **Date of Patent: *Aug. 10, 2021**

(54) MANAGEMENT SYSTEM FOR MANAGING COMPUTER SYSTEM

(71) Applicant: Hitachi, Ltd., Tokyo (JP)

(72) Inventor: Shunsuke Uesaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 16/666,804

(22) Filed: Oct. 29, 2019

(65) Prior Publication Data

US 2020/0065153 A1 Feb. 27, 2020

Related U.S. Application Data

(63) Continuation of application No. 15/752,620, filed as application No. PCT/JP2016/062960 on Apr. 26, 2016, now Pat. No. 10,509,678.

(51) Int. Cl.

| | |
|---|---|
| ***G06F 9/50*** | (2006.01) |
| ***G06F 11/32*** | (2006.01) |
| ***G06F 11/34*** | (2006.01) |
| ***G06F 11/30*** | (2006.01) |

(52) U.S. Cl.

CPC .......... *G06F 9/5038* (2013.01); *G06F 9/5077* (2013.01); *G06F 11/3024* (2013.01); *G06F 11/32* (2013.01); *G06F 11/34* (2013.01); *G06F 11/3433* (2013.01)

(58) Field of Classification Search

None

See application file for complete search history.

(56) References Cited

U.S. PATENT DOCUMENTS

| | | | |
|---|---|---|---|
| 9,052,938 | B1 | 6/2015 | Bhide |
| 2009/0125846 | A1 | 5/2009 | Anderson |
| 2009/0172666 | A1 | 7/2009 | Yahalom |
| 2010/0268816 | A1 | 10/2010 | Tarui et al. |
| 2015/0186806 | A1 | 7/2015 | Hiltz-Laforge |

FOREIGN PATENT DOCUMENTS

| | | |
|---|---|---|
| JP | 2010-250689 A | 11/2010 |

OTHER PUBLICATIONS

International Search Report of PCT/JP2016/062960 dated Jul. 12, 2016.

*Primary Examiner* — Kyle Zhai

(74) *Attorney, Agent, or Firm* — Mattingly & Malur, PC

(57) ABSTRACT

A table of time series sequences is displayed, in which plural resources serve as base points. The table is a matrix including one or more first lines and plural second lines. The first lines extend parallel to each other in a first direction, and the second lines extend parallel to each other in a second direction perpendicular to the first direction; and each of the lines comprises time series sequence objects. Plural base point resources are respectively associated with the second lines. Metric types corresponding to the resources related to the base point resources are respectively associated with the first lines. The time series sequence object associated with both the mth first line and the nth second line represents a time series sequence of metric values of the mth first line and that are exhibited by a resource related to the base point resource associated with the nth second line.

12 Claims, 15 Drawing Sheets

53
120 127 126
123L1 123L2 123L3 123L4 123L5
VM21 @HV4 VM22 @HV4 VM23 @HV4 VM24 @HV4 VM25 @HV4
VM — VM CPU Load — 129 — 121L1
VM — V-Disk Write Latency — 121L2
CPU — CPU Load — 121P1
CPU — CPU Total Load — 121P2
CPU — CPU Total Ready — 121P3
Disk — Disk Read Rate — 121P4
Disk — Disk Write Rate — 121P5
Disk — Disk Read Latency — 121P6
(Legend) Error Warning Normal 100
551
552
553
555
557
501
502
503
505
507
511
513
521
522
533
535
537
541
543
561
563
565
567
130
131
132
I/F LAN
Server
SAN
Storage
IP Switch12
IP Switch13
IP Switch14
VM21
VM22
VM23
VM24
VM25
VM26
VM27
VM28
VM29
VM30
Cluster#08
HV4
HV5
HV6
HV7
Cluster#09
DS3
DS4
FC Switch4
FC Switch5
Storage#02
FC Switch4
FC Switch5
Storage#02
Port3
Port4
Port5
Port6
MP4
MP5
MP6
MP7
MP8
MP9
LDEV15
LDEV16
LDEV17
LDEV18
LDEV19
LDEV20
LDEV21
LDEV22
Pool31
Pool32
Pool33
PG58
PG59
PG60
PG61
PG62
PG63
PG64
PG65
PG66
VM 21
VM 22
VM 23
VM 24
VM 25
CPU 1
CPU 2
CPU 3
CPU 4
DISK 1
DISK 2
HV4

FIG. 3

Resource table
400

| Resource ID | Resource name | Resource type ID |
|---|---|---|
| 1 | VM21 | 1 |
| 2 | VSP#02 | 2 |
| 3 | VM24 | 1 |
| 4 | MP4 | 3 |
| 5 | CPU3 | 4 |
| 6 | DS4 | 5 |
| ... | ... | ... |

FIG. 4

Related resource table
500

| Resource ID | Child resource ID |
|---|---|
| 1 | 2 |
| 3 | 2 |
| 5 | 8 |
| 2 | 4 |
| ... | ... |

FIG. 5

Resource type table
550

| Resource type ID | Resource type name | Attribute | Layer name |
|---|---|---|---|
| 1 | VM | Logical | Server |
| 2 | Storage | Physical | Storage |
| 3 | MP | Physical | Server |
| 4 | CPU | Physical | Server |
| 5 | Data Store | Physical | Server |
| ... | ... | ... | ... |

FIG. 6

Metric type table
600

| Metric type ID | Metric type name | Resource type ID |
|---|---|---|
| 1 | CPU Load | 4 |
| 2 | Memory Used | 10 |
| ... | ... | ... |

FIG. 7

Time series data table
700

| Resource ID | Metric type ID | Acquisition time point | Metric value |
|---|---|---|---|
| 5 | 1 | 2016/03/13 09:00:00 | 10 |
| 12 | 2 | 2016/03/13 09:00:01 | 48 |
| 5 | 1 | 2016/03/13 09:15:00 | 7 |
| 12 | 2 | 2016/03/13 09:15:01 | 30 |
| 5 | 1 | 2016/03/13 09:30:00 | 55 |
| 12 | 2 | 2016/03/13 09:30:01 | 16 |
| ... | ... | ... | ... |

FIG. 8

Row order table
800

| Row number | Metric type ID |
| --- | --- |
| 1 | 1 |
| 2 | 5 |
| ... | ... |

FIG. 9

Column order table
900

| Column number | Resource ID |
| --- | --- |
| 1 | 1 |
| 2 | 9 |
| ... | ... |

FIG. 10

Threshold table
1000

| Resource ID | Metric type ID | Warning threshold | Abnormal threshold |
| --- | --- | --- | --- |
| 5 | 1 | 70 | 80 |
| 12 | 2 | 80 | 90 |
| ... | ... | ... | ... |

Start
S1601
S1602
End
Start
S1611
S1612
S1613
S1614
S1615
S1616
S1617
End
Start
(A)
S1621
(B)
S1622
S1623
No
Yes
S1624
S1625
(B)
(A)
End 552
552
553
I/F
522
100
I/F
551
561
567
563
565
565
I/F
553
553
551
555
555
521
502
501
511
513
505
555
503
507
537
535
1543
1541
1131
132
133
134
135
1130
533
1557

FIG. 18

Time series score table
1800

| Resource ID | Metric type ID | Worst metric value | Time series score |
|---|---|---|---|
| 5 | 1 | 97 | 121 |
| 12 | 2 | 54 | 60 |
| ... | ... | ... | ... |

FIG. 19

| Resource type name | Metric type ID | LR1 | LR2 | LR3 | LR4 | LR5 |
|---|---|---|---|---|---|---|
| CPU | 1 | 120 | 30 | 40 | 20 | 50 |
| | 2 | 110 | 150 | 50 | 30 | 20 |
| | 3 | 10 | 50 | 20 | 20 | 10 |

| # | LR1 | LR2 | LR3 | LR4 | LR5 |
|---|---|---|---|---|---|
| LM1 | 6 | 3 | 4 | 2 | 5 |
| LM2 | 4 | 8 | 5 | 3 | 2 |
| PM1 | 1 | 5 | 2 | 2 | 1 |
| PM2 | 4 | 2 | 2 | 1 | 3 |
| PM3 | 2 | 4 | 6 | 3 | 1 |

⇩

20B

| # | LR1 | LR2 | LR3 | LR4 | LR5 |
|---|---|---|---|---|---|
| LM2 | 4 | 8 | 5 | 3 | 2 |
| LM1 | 6 | 3 | 4 | 2 | 5 |
| PM3 | 2 | 4 | 6 | 3 | 1 |
| PM1 | 1 | 5 | 2 | 2 | 1 |
| PM2 | 4 | 2 | 2 | 1 | 3 |

20B
20C
20D
20E
20F
20G

MANAGEMENT SYSTEM FOR MANAGING COMPUTER SYSTEM

TECHNICAL FIELD

The present invention relates generally to management of a computer system that includes multiple resources of multiple resource types.

BACKGROUND ART

In recent years, in IT systems (e.g., cloud infrastructure), operations are often made with allocation to users physical resources, such as "CPU" and "memory", with units of logical resources, such as "virtual machine" and "volume". There is a technique of operating IT systems using a system monitoring technique, such as baseline monitoring, in order to monitor performance information on IT systems having a complex relationship between user resources (e.g., logical resources to be recognized by users) and system resources (e.g., physical resources not to be recognized by the users). Such a type of technique can display a graph of performance information on a specific resource (e.g., a resource that causes an abnormality) in an IT infrastructure system. For example, the technique of PTL 1 can determine the bottleneck in a system where multiple virtual computers share physical resources, in consideration of the physical resource allocation policy and effects on software.

CITATION LIST

Patent Literature

[PTL 1] Japanese Patent Laid-Open No. 2010-250689

SUMMARY OF INVENTION

Technical Problem

Hereinafter, display of information related to at least one resource in a computer system to be managed is sometimes called "resource display" for the sake of convenience.

According to the technique of PTL 1, a graph is displayed where the amounts of resources in use corresponding to the respective LPARs that use the physical resource concerned are stacked. This graph allows the LPAR of the bottleneck to be identified from among the LPARs. That is, resource display with one physical resource adopted as a base point, can be made. But, resource display with two or more different resources adopted as base points, cannot be made.

For the sake of identifying the bottleneck, it can be considered that tree-structured resource display, that is, topology display can be adopted. In the topology display, the state of each resource can be displayed. But, the displayed resource state is only the state at a certain time point, and is only a state among the states in multiple stages. That is, the amount of information is reduced in comparison with that in time series display, such as of a graph.

Solution to Problem

This management system displays a table of time series sequences, in which two or more resources serve as base points. The table of time series sequences is a matrix including one or more first lines and two or more second lines. The one or more first lines extend parallel to each other in a first direction and each comprise time series sequence objects. The two or more second lines extend parallel to each other in a second direction orthogonal to the first direction and each comprise time series sequence objects. Two or more base point resources are respectively associated with the two or more second lines. One or more metric types corresponding to one or more resources related to the two or more base point resources are respectively associated with the one or more first lines. The time series sequence object associated with both the mth first line and the nth second line represents a time series sequence of metric values that are of the metric type associated with the mth first line and that are exhibited by a related resource related to the base point resource associated with the nth second line.

Advantageous Effects of Invention

The resource display having high viewability with two or more resources adopted as base points is realized.

BRIEF DESCRIPTION OF DRAWINGS

FIG. 3 shows an example of a resource table.

FIG. 4 shows an example of a related resource table.

FIG. 5 shows an example of a resource type table.

FIG. 6 shows an example of a metric type table.

FIG. 7 shows an example of a time series data table.

FIG. 8 shows an example of a row order table.

FIG. 9 shows an example of a column order table.

FIG. 10 shows an example of a threshold table.

FIG. 18 shows an example of a time series score table.

FIG. 19 is a diagram illustrating a metric type narrowing-down process.

FIG. 20 is a diagram illustrating a graph row permutation process.

DESCRIPTION OF EMBODIMENTS

Figure 1:
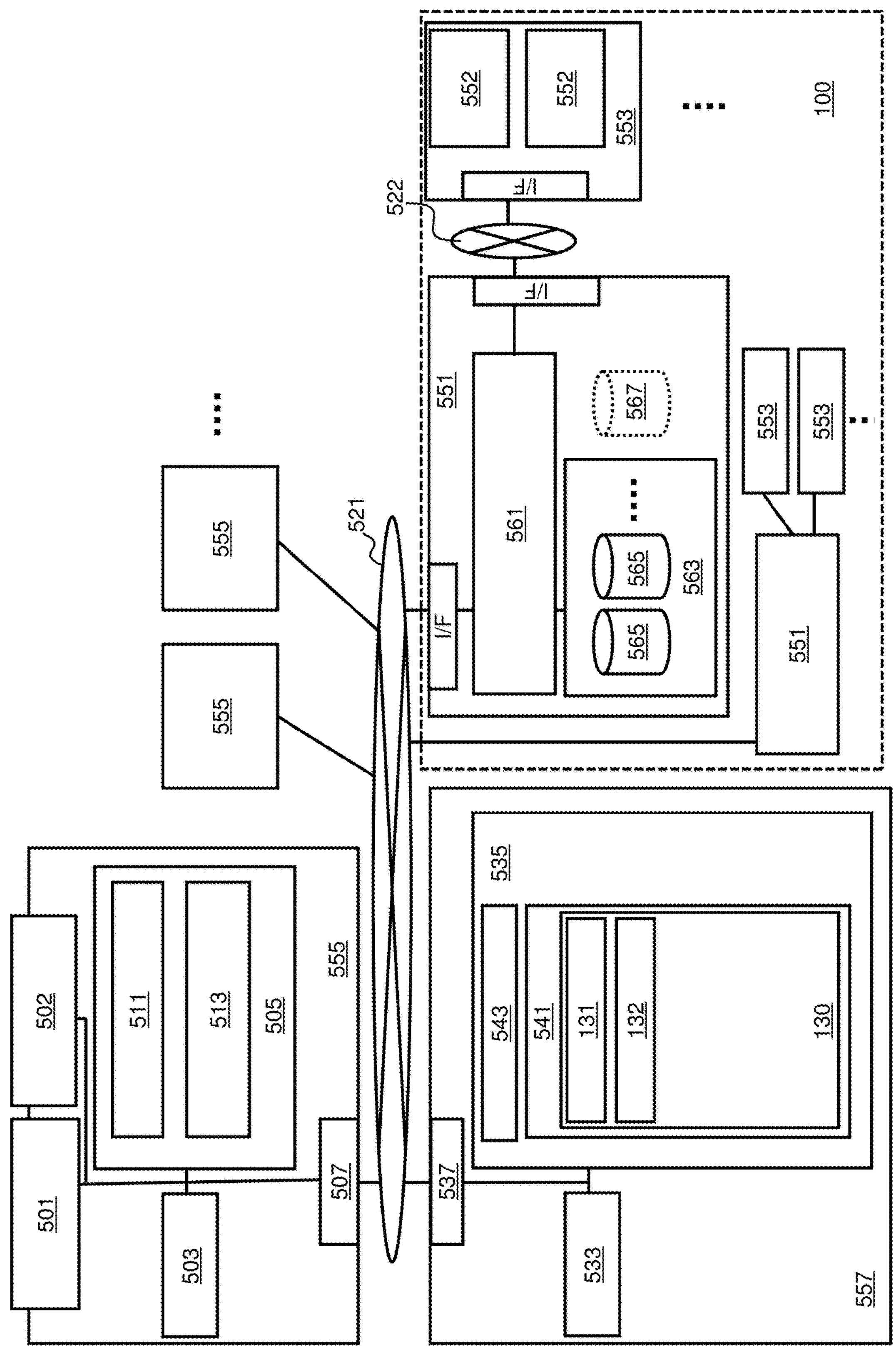
FIG. 1 shows configurations of a computer system and a management system according to Embodiment 1.

Some embodiments are hereinafter described.

In the following description, information is sometimes described in representation, such as "abc table". Alternatively, the information may be represented in a data structure other than that of a table. In order to indicate independency of the data structure, at least one of "abc tables" can be called "abc information".

In the following description, a process is sometimes described with "program" being adopted as a subject of a sentence. A program is executed by a processor (e.g., CPU (Central Processing Unit)) to execute a predetermined process appropriately using a storage resource (e.g., a memory) and/or a communication interface device (e.g., a communication port). Accordingly, the subject for a process in a sentence may be the processor. The process described with the program being adopted as the subject of a sentence may be a process to be executed by the processor or an apparatus that includes the processor. The processor may include a hardware circuit that performs some or all processes. The program may be installed from a program source into an apparatus, such as a computer. The program source may be, for example, a program distribution server, or a computer-readable storing medium. In the case where the program source is the program distribution server, the program distribution server includes a processor (e.g., CPU), and a storage resource. The storage resource further stores a distribution program, and a program that is a distribution target. The processor of the program distribution server executes the distribution program, thereby allowing the processor of the program distribution server to distribute the program that is the distribution target to another computer.

A management system may constituted by one or more computers. More specifically, for example, in a case where a management computer displays information (more specifically, in a case where the management computer displays information on its own display device, or the management computer transmits display information to a display computer), the management computer may constitute the management system. For example, in a case where multiple computers realize a function equivalent to that of the management computer, these computers (that may include the display computer in a case where the display computer performs display) constitute the management system. Input of information into a computer, or output of information from the computer may be performed by an input and output device included in the computer. A display device, a keyboard, and a pointing device can be considered as examples of input and output devices. Instead of or in addition to at least one of these devices, another device may be adopted. Instead of the input and output device, a serial interface device or an Ethernet interface device (Ethernet is a registered trademark) may be adopted. The display computer that includes a display device, a keyboard and a pointer device may be coupled to such an interface device, the computer may transmit display information to the display computer, and the computer may receive information to be input, from the display computer, thereby allowing the information to be output (for example, displayed) and input. In the following description, a management server 557 serves as the management computer, and a management client 555 may constitute the display computer.

In the following description, "resource" means a configuration element of a computer system. More specifically, each of multiple nodes (apparatuses) that constitute the computer system, and each of multiple components included in these nodes is integrally called a resource. The nodes include a physical node (e.g., a network switch), and a logical node (e.g., a virtual machine). Likewise, the components include a physical component (e.g., a microprocessor), and a logical component (e.g., LDEV (logical volume)). That is, the resources include physical resources, and logical resources. The physical resources include, for example, a physical CPU, a physical memory, etc. The logical resources are resources to which some of one or more physical resources are allocated, and resources corresponding to at least one resource among resources that use at least some of one or more physical resources. The logical resources are, for example, an APP, a logical volume, a VM (Virtual Machine), etc.

In the following description, "related resource" that is related to the resource (a resource related to the resource) is a resource directly or indirectly linked to the resource. In a case where the related resource is "directly" linked to the resource, no other resource intervenes between the resource and the related resource. In a case where the related resource is "indirectly" linked to the resource, one or more other resources intervene between the resource and the related resource. The related resource higher than the resource can be called "higher related resource". The related resource lower than the resource can be called "lower related resource". Among the higher related resources, the related resource directly linked to the resource can be called "parent resource". Among the lower related resources, the related resource directly linked to the resource can be called "child resource". The concepts of "higher/lower" and "parent/child" sometimes change according to what is managed (for example, monitored) by the user. The concepts may be omitted. For example, in a case where the relationship is "coupling relationship" via an FC (Fibre Channel) switch between a server and a storage system, it is not uniquely determined which is higher and the parent between the server and the storage system simply in view of coupling. It may be determined whether the server is considered to be higher or the storage system is considered to be higher, or whether the concept of high and low is introduced or not, on the basis of the user's standpoint. On the contrary, in the case of relationship is of involvement (for example, a node includes a component), the concept that the component is at an lower level (or is a child) is common irrespective of the standpoint of the user.

In the following description, a name or an ID is used as resource identification information, the name and ID may be replaced with each other. Instead of or in addition to at least one of the name and ID, another type of identification information may be used.

In the following description, an operation made by the user (e.g., an administrator) using an input device through a GUI (Graphical User Interface) adopted as a management screen for the computer system, is called "user operation". The input device used for the user operation is typically a pointing device or a touch screen. In the following embodiments, the processor of the management system can input and output information (for example, display a GUI, accept information input into the GUI and the like) through an interface unit. The interface unit may include at least one of a network interface (e.g., the I/F 537), an interface device for the input device, and an interface device for the display device. Two or more interface devices among these interface devices may be integrally constituted.

In the following description, when elements of the same type are described without discrimination, common parts of reference signs are used. When elements of the same type are described with discrimination, the IDs of the elements (or the reference signs of the elements) are used in some cases. For example, when the graph rows are described without specific discrimination with reference to after-mentioned FIG. 12, description is made with "graph row 121", "graph row 121L" or "graph row 121P". When the individual graph rows are described with discrimination, description is sometimes made with "graph row 121L1", "graph row 121L2", "graph row 121P1" . . . .

Embodiment 1

FIG. 1 shows configurations of a computer system and a management system according to Embodiment 1.

The computer system 100 includes one or more hosts 553, and one or more storage systems 551 coupled to the one or more hosts 553. For example, the host 553 is coupled to the storage system 551 via a communication network 521 (e.g., SAN (Storage Area Network) or LAN (Local Area Network)).

The storage system 551 includes a physical storage device group 563, and a controller 561 coupled to the physical storage device group 563.

The physical storage device group 563 includes one or more PGs (Parity Groups). The PG is also called a RAID (Redundant Array of Independent (or Inexpensive) Disks) group in some cases. The PG is constructed by multiple physical storage devices, and stores data according to a predetermined RAID level. The physical storage device is, for example, an HDD (Hard Disk Drive) or an SSD (Solid State Drive).

The storage system 551 includes multiple logical volumes. The logical volumes include substantial logical volumes (real volumes) 565 based on PG, and virtual logical volumes (virtual volumes) 567 in conformity with the thin provisioning or storage virtualization technique. A single storage system 551 does not necessarily include various types of logical volumes. For example, the storage system 551 may only include the real volumes 565. Storage areas from a pool are allocated to the virtual volumes in conformity with the thin provisioning. The pool is a storage area group based on one or more physical storage devices (e.g., PG). For example, the pool may be a group of one or more logical volumes. Instead of the pool that includes storage areas allocated to the virtual volumes in conformity with the thin provisioning, the pool may be a pool that stores the differences between original logical volumes and their snapshots.

The controller 561 includes multiple devices, for example, ports, an MPB (a blade (circuit board) including one or more microprocessors (MPs)), and a cache memory. For example, the port receives an I/O (Input/Output) command (a write command or a read command) from the host 553, and the MP included in the MPB controls I/O of the data according to the I/O command. More specifically, for example, the MP identifies the logical volume that is the I/O destination on the basis of the received I/O command, and performs the data I/O for the identified logical volume. The data subjected to the I/O for the logical volume is temporarily stored in the cache memory.

The host 553 may be physical machine (physical computer) or virtual machine (VM). The host 553 executes one or more application programs (APPs) 552. Execution of the APP 552 allows the host 553 to transmit the I/O command that specifies the logical volume, to the storage system 551.

As described above, the computer system 100 includes the tiered resources. The multiple resources include, more specifically, at least two types of resources among the APPs 552, the hosts 553, the storage systems 551, the controller 561, the ports, the MPB, the cache memory, the logical volumes, and the PGs. Multiple resources on the same layer may be grouped to define resources higher than those on the layer. The "resource" may be a substantial resource, such as the APP or logical volume (any of the logical resource and physical resource), and a virtual resource that is a group of substantial resources.

The management system includes the management server 557, and one or more management clients 555. The management client 555 is coupled to the management server 557 via the communication network (e.g., LAN, WAN (World Area Network) or the Internet) 521.

The management client 555 includes an input device 501, a display device 502, a storage device (e.g., memory) 505, a communication interface device (hereinafter I/F) 507, and a processor (e.g., CPU (Central Processing Unit)) 503 coupled to these elements. The input device 501 is, for example, a pointing device and a keyboard. The display device 502 is, for example, a device including a physical screen on which information is displayed. A touch screen, in which the input device 501 and the display device 502 are integrated, may be adopted. The I/F 507 is coupled to the communication network 521. The management client 555 can communicate with the management server 557 via the IF 507. A part or the entire communication network 521 may be common to the network that couples the hosts 553 and the storage systems 551 to each other.

The storage resource 505 includes, for example, a main storage device (typically, a memory) among the main storage device and auxiliary storage devices. The storage resource 505 can store a computer program to be executed by the processor 503, and information to be used by the processor 503. More specifically, for example, the storage resource 505 stores a web browser 511, and a management client program 513. The management client program 513 may be an RIA (Rich Internet Application). More specifically, for example, the management client program may be a program file, and may be downloaded from the management server 557 (or another computer) and stored in the storage resource 505.

The management server 557 includes a storage resource 535, the I/F 537, and a processor (e.g., CPU (Central Processing Unit)) 533 coupled to these elements. The I/F 537 is coupled to the communication network 521. The management server 557 can communicate with the management client 555 via the IF 537. The management server 557 can receive an instruction according to a user operation, and draw a display object in a layout area, via the I/F 537. Accordingly, the I/F 537 is an example of the I/O interface device. The "layout area" described here is an area in which the display object is drawn. The range of the entire or a part of the layout area is a display range of a frame (e.g., window) displayed by the web browser 511 (or the management client program 513). A display image (including the display object) in the frame in the layout area in which the display object is drawn can be regarded as a display screen or a GUI screen. Objects overlapping with the display range among objects drawn in the layout area are displayed on a physical screen of the display device 502. Accordingly, drawing of the object in the layout area is substantially an example of displaying of the object.

The storage resource 535 includes, for example, a main storage device (typically, a memory) among the main storage device and auxiliary storage devices. The storage resource 535 can store a computer program to be executed by the processor 533, and information to be used by the processor 533. More specifically, for example, the storage resource 535 stores a management server program 541, and a management table group 543. The management table group 543 includes the tiered relationship (configuration information) of multiple resources included in the computer system, and failure information on each resource. Information on at least a part of the management table group 543 may be collected by the management server program 541, or acquired through access to another management system that holds the information. The management server program 541 receives the instruction according to the user operation from the management client 555, and transmits information to be drawn in the layout area to the management client 555. The management server program 541 includes a display control program 130 that executes display control. The display control program 130 controls display with reference to at least a part of the management table group 543. More specifically, for example, the display control program 130 includes a graph table display module 131 for displaying a graph table screen described later, and a highlight display module 132 for performing highlight display described later. In this embodiment, processes that are performed by the display control program 130 and are other than the processes performed by the highlight display module 132, are performed by the graph table display module 131. This embodiment assumes that the display control program 130 is included in the management server program 541, for the sake of avoiding lengthy description. The display control can, however, be performed on the basis of information collected or updated by a function that is of the management table group 543 and is other than that of the display control program 130. Accordingly, the display control program 130 may be outside of the management server program 541 (may be a program additionally installed, for example).

A cooperative process by the management server program 541, the web browser 511 (or an RIA executing environment in the client), and the management client program 513 realizes GUI screen display according to the user operation. The management server program 541 may create a screen and provide the management client program 513 with display information on the created screen, and the management client program 513 may display the screen on the basis of the display information, or a part of an image creation process (e.g., a drawing process) may be offloaded from the management server program 541 to the management client program 513. Examples of the cooperation are as follows. For the sake of simplicity of description, a case where (cooperation example 2) is adopted in this embodiment is described. It is, however, a matter of course that the technique is applicable to a cooperation example 1.

Cooperation Example 1

The management server program 541 transmits at least a part of information included in the management table group 543 to the web browser 511 (or the management client program 513), and the web browser 511 (or the management client program 513) stores the received part, as temporary information, in the storage resource 505. The web browser 511 (or the management client program 513) draws the display object in the layout area (for example, newly draws, or increases or zooms in or out the display object) on the basis of the instruction according to the user operation and the temporary information.

Cooperation Example 2

The management server program 541 receives the instruction according to the user operation for the display screen from the web browser 511 (or the management client program 513), creates the display information on the display object on the basis of the instruction and the management table group 543, and transmits the display information. The web browser 511 (or the management client program 513) receives the display information, and draws the display object in the layout area according to the display information. That is, in brief, the management server program 541 draws the display object in the layout area. When a user operation is made on the GUI screen, the web browser 511 (or the management client program 513) transmits an instruction according to the user operation to the management server program 541.

Hereinafter, for the sake of avoiding lengthy description, it is assumed that the display control is performed by the management server program 541 (display control program 130).

Figure 2:
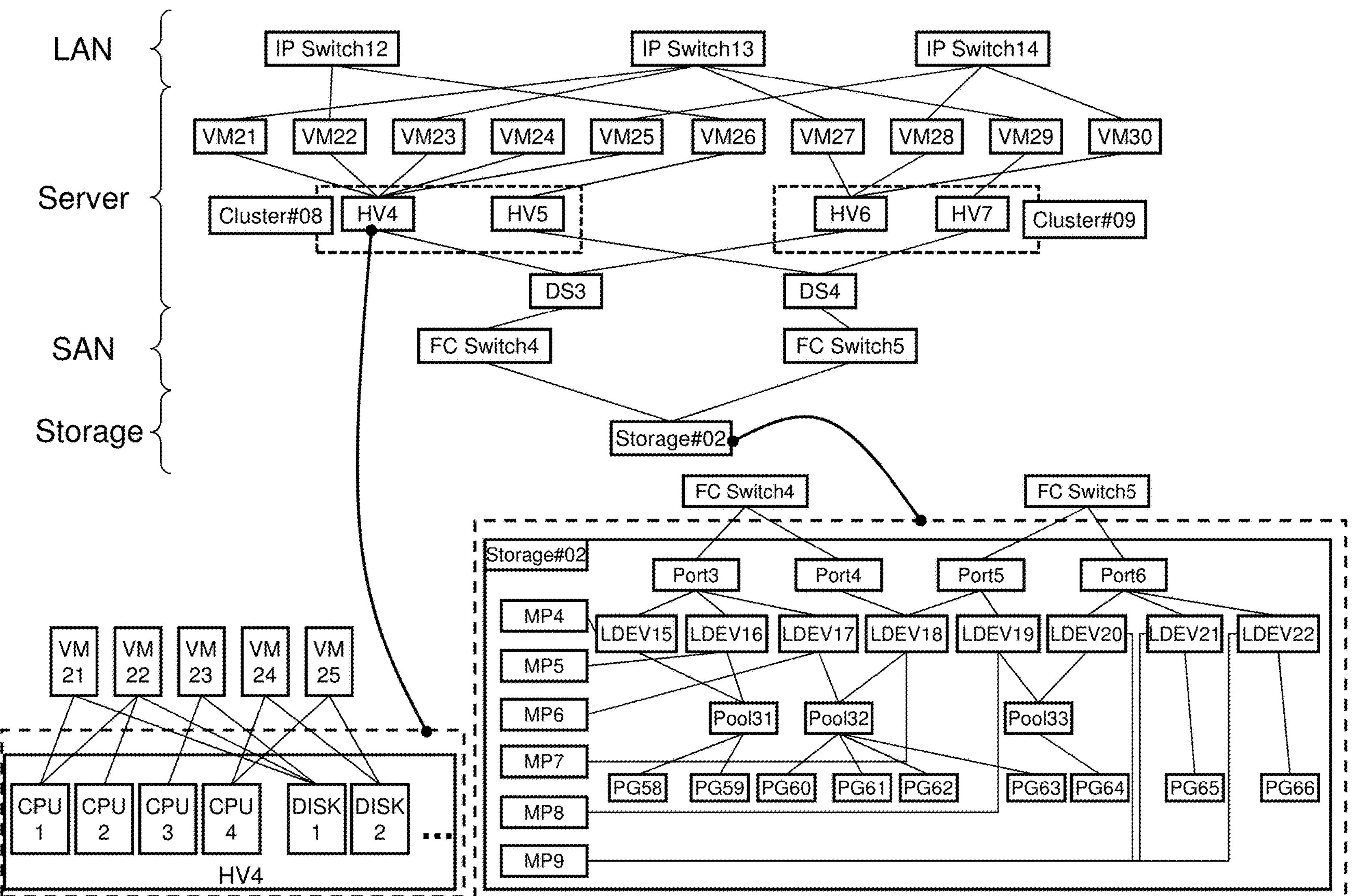
FIG. 2 shows an example of a part of the topology of the computer system.

FIG. 2 shows an example of a part of the topology of the computer system 100.

Multiple layers include, for example, "LAN", "Server", "SAN" and "Storage", in the descending layer order. The resources belonging to the layer "LAN" are "IP-Switches" (IP switches in LAN). The resources belonging to the layer "Server" are "VM", "HV" and "DS". The "VM" is a virtual machine. The "HV" is a hypervisor that is for controlling one or more virtual machines and is executed by the host. Examples of the resource included in the HV (e.g., HV4) include CPU and DISK (an example of a physical storage device). Multiple HVs constitute one cluster ("Cluster"). The cluster may be one of resources. The "DS" is a datastore, which is recognized as a storage device by the hypervisor. The resources belonging to the layer "SAN" are "FC-Switches" (FC (Fibre Channel) switches in SAN). The resource belonging to the layer "Storage" is "Storage" (storage system). Examples of the resources included in the "Storage" (e.g., Storage #02) include multiple components in the storage system, for example, "Port", "LDEV", "MP", "Pool" and "PG". The "Port" is a communication port that is coupled to an FC switch and accepts an I/O command from the VM. The "LDEV" is a logical volume (real volume or virtual volume). The "MP" is a microprocessor. The "Pool" is a storage area that includes a real area allocated to the virtual volume according to the thin provisioning. The "PG" is a parity group.

The topology configuration as shown in FIG. 2 is a configuration identified from configuration information represented by the management table group 543. One or more resource types may belong to a single layer. Two or more resources of the same resource type may constitute one group. In this case, multiple groups reside for the single resource type. One or more resources of the resource type may reside for each group. That is, the "layer" is an aggregation of different resource types. The "group" is an aggregation of different resources of the same resource type. At least one of the layer and the group may be defined by the user.

Hereinafter, referring to FIGS. 3 to 10, examples of tables contained in the management table group 543 is described.

FIG. 3 shows an example of a resource table.

The resource table 400 includes information related to the resource. The resource table 400 includes, for example, records for the respective resources. Each record includes a resource ID, a resource name, and a resource type ID.

FIG. 4 shows an example of a related resource table.

The related resource table 500 represents the relationship between resources. For example, the related resource table 500 includes records for the respective resources. Each record includes the resource ID, and a child resource ID (the ID of a child resource of the resource). The management server program 541 can identify the related resource of the selected resource from the related resource table 500, using the ID of the selected resource. For example, the management server program 541 regards, as the base point, the record that includes the ID of the selected resource as the resource ID, and can identify the lower related resource on the basis of the record identified from the related resource table 500. The management server program 541 regards, as the base point, the record that includes the ID of the selected resource as the child resource ID, and can identify the higher related resource on the basis of the record identified from the related resource table 500. Each record of the related resource table 500 may include a parent resource ID instead of or in addition to the child resource ID.

FIG. 5 shows an example of a resource type table.

The resource type table 550 includes information related to the resource type. For example, the resource type table 550 includes records for each resource type. Each record includes a resource type ID, a resource type name, an attribute (indicating whether the resource is the logical resource or the physical resource), and the layer name (the name of the layer to which the resource type belongs).

FIG. 6 shows an example of a metric type table.

The metric type table 600 includes information related to the metric type. The metric type table 600 includes, for example, records for the respective metric types. Each record includes a metric type ID, a metric type name, and a resource type ID (the ID of the resource type of the resource whose metric value belonging to the metric type is collected).

In this embodiment, the "metric value" is a value collected with respect to the resource, and is at least one of the performance and the amount of resource consumption, for example. The evaluation of the merit of the metric value depends on the metric type. For example, in a case where the metric type is the response time, the smaller the metric value is, the better the merit is, and the larger the metric value is, the worse the merit is. In a case where the metric type is the data transfer rate, the larger the metric value, the better the merit is, and the smaller the metric value is, the worse the merit is.

In this embodiment, the correspondence between the metric type ID and the resource type ID is 1:1 or many:1. That is, for one resource type, one or more metric types exist, while one metric type does not correspond to multiple resource types. However, the present invention is not limited thereto. For example, one metric type may correspond to multiple resource types.

FIG. 7 shows an example of a time series data table.

The time series data table is an example of time series information, and is a table that includes metric data collected with respect to the resource. Each record of the time series data table includes information contained in a piece of metric data. More specifically, for example, each record includes the resource ID (the ID of the resource corresponding to the collected metric value), the metric type ID (the ID of the metric type of the collected metric value), the acquisition time point (the time point of acquisition of the collected metric value (the time point when the metric is collected may be adopted instead)), and the metric value. The time point is represented as year/month/day/hour/minute/second. The representation format is not limited thereto.

FIG. 8 shows an example of a row order table. FIG. 9 shows an example of a column order table.

The row order table 800 is a table that represents the order of the graph row of a graph matrix. The row order table 800 includes, for example, records for the respective graph rows. Each record includes the row number (the number of the graph row), and the metric type ID. The row number of the beginning graph row is the smallest number. In this embodiment, the beginning graph row is the top graph row. However, the order is not limited thereto. In this embodiment, the smaller the row number is, the higher the order is. Alternatively, it may be configured such that the larger the row number is, the higher the order is.

The column order table 900 is a table that represents the order of the graph column of the graph matrix. The column order table 900 includes, for example, records for the respective graph columns. Each record includes the column number (the number of the graph column), and the resource ID. The column number of the beginning graph column is the smallest number. In this embodiment, the beginning graph column is the leftmost graph column. However, the order is not limited thereto. In this embodiment, the smaller the column number is, the higher the order is. Alternatively, it may be configured such that the larger the column number is, the higher the order is.

The "graph matrix" is a matrix in which a graph table is represented, and includes graph rows and graph columns. The "graph row" is a row with which the metric type is associated. The "graph column" is a column with which the resource is associated. The intersection (intersecting area) of a graph row and a graph column is called "cell". In the cell, a graph that represents the time series sequence of the metric value of the metric type associated with the graph row that includes the cell is displayed with respect to the resource associated with the graph column that includes the cell. The graph matrix is described later in detail.

FIG. 10 shows an example of a threshold table.

The threshold table 1000 includes information related to a threshold to be compared with the metric value. The threshold table 1000 includes, for example, records for the respective combinations of the resources and the metric types. Each record includes the resource ID, the metric type ID, a warning threshold, and an abnormal threshold. The warning threshold is an example of a first threshold. The abnormal threshold is an example of a second threshold. The second threshold is worse than the first threshold. It depends on the metric type whether the second threshold, which is worse than the first threshold, is larger or smaller than the first threshold (i.e., it depends on the relationship between the comparative merit and the magnitude of the metric value). For at least one combination (the combination of the resource and the metric type), the number of thresholds is not limited to two, and may be one or three or more instead. The threshold may be prepared for each metric type (in other words, the resource ID may not be associated with at least one metric type).

Resource display is performed on the basis of the management table group 543 that includes the tables shown in FIGS. 3 to 10 described above. The "resource display" is display of information related to at least one resource in the computer system 100. The representations of the resource display include topology display and graph table display. A screen of the topology display (e.g., GUI) is called "topology screen". A screen of the graph table display is called "graph table screen". Both the topology screen and the graph table screen are displayed by the display control program 130. As to each of the topology screen and the graph table screen, acceptance of the user operation (e.g., clicking), and screen update in response to the user operation are performed by the display control program 130.

An example of the processes executed by this embodiment is hereinafter described. In the following description, for the sake of avoiding lengthy description, description that display is performed "by the management server 557 (management server program 541)" is sometimes omitted. The following description mainly includes description of a process related to display control. The process related to display control is performed by the display control program 130 (for example, by the display control program 130 cooperating with programs (not shown) that are in the management server program 541 and other than the display control program 130). In the process related to display control, at least one table in the management table group 543 is appropriately referred to by the display control program 130. The processes other than the process related to display control, for example, a process of collecting the pieces of the metric data of the respective resources in the computer system 100, and a process of adding the records containing information on at least a part of the collected pieces of metric data to a time series data table 700, may be performed by the programs (not shown) that are in the management server program 541 and other than the display control program 130.

Figure 11:
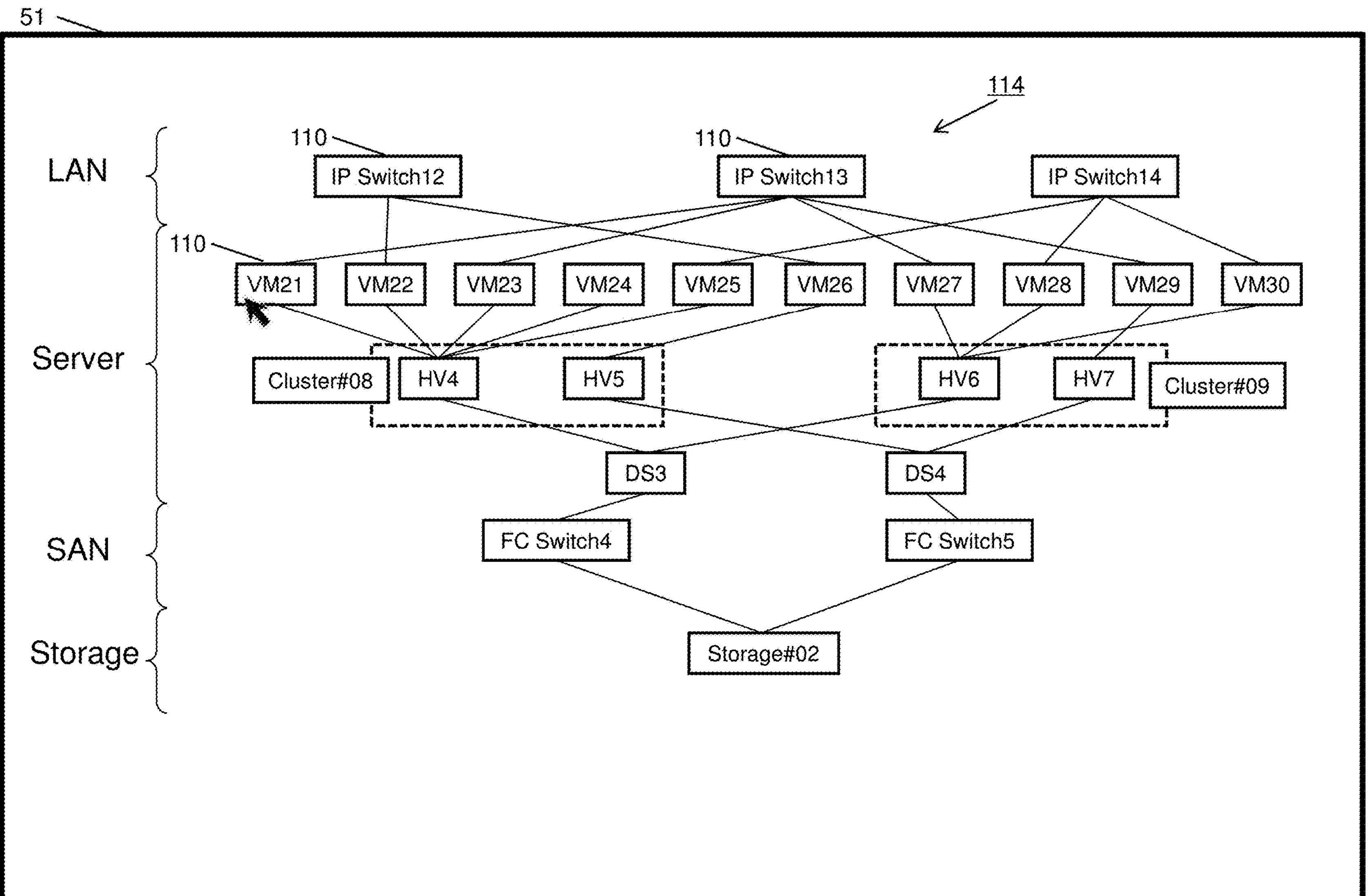
FIG. 11 shows an example of a topology screen.

FIG. 11 shows an example of a topology screen.

The topology screen 51 is displayed by the display control program 130. The topology screen 51 is an example of a resource selection screen (a screen on which multiple resources are displayed in a selectable manner). On the topology screen 51, a topology 114 of the computer system 100 is displayed. The topology 114 has a tree structure that includes nodes and links. The node is a resource object 110. The resource object 110 is a display object (e.g., a rectangle object) corresponding to the resource. For example, the resource name (e.g., "IP Switch 12") of the resource corresponding to the resource object 110 is displayed in the resource object 110. The link indicates the relationship between the resources.

The display control program 130 accepts the user's resource selection, more specifically, accepts selection of the resource object 110 in the topology 114 from the user. Upon acceptance of the resource selection, the display control program 130 displays a graph table screen where at least two resources including the selected resource are adopted as base points. The number of selected resources may be one or more. It is herein assumed that the resource object "VM21" is selected, and resultantly, a graph table screen 53 exemplified in FIG. 12 is displayed.

The topology screen 51 is an example of the resource selection screen. The display control program 130 displays the graph table screen in response to the user's resource selection. On the graph table screen, the graph table display is performed where two or more resources (one resource may be adopted) serve as base points. Each of the two or more base point resources (resources adopted as base points) is any of a selected resource (the resource selected on the resource selection screen by the user) and a condition satisfying resource (a resource that satisfies a predetermined resource condition). That is, two or more base point resources include at least one of the selected resource and the condition satisfying resource. The resource selection screen is not necessarily limited to the topology screen 51. Alternatively, this screen may be any screen on which the resources are displayed in a selectable manner. For example, the resource selection screen may be a screen of a table of resources in the computer system 100. On the table screen, the resource objects may be displayed in a table. Alternatively, a screen may be adopted where the resource names are displayed in a table by means of a menu, such as a pull-down menu. On the resource selection screen (e.g., the topology screen 51), the state of the resource may be displayed. The state of the resource may be represented by any of a character string, mark (icon), highlight display (for example, change in font or color) and the like. For example, on the topology screen 51, a mark that means a state "Warning" may be indicated at the resource object of the resource having a value exceeding the warning threshold, and a mark that means a state "Error" may be indicated at the resource object of the resource having a value exceeding the abnormal threshold.

Figure 12:
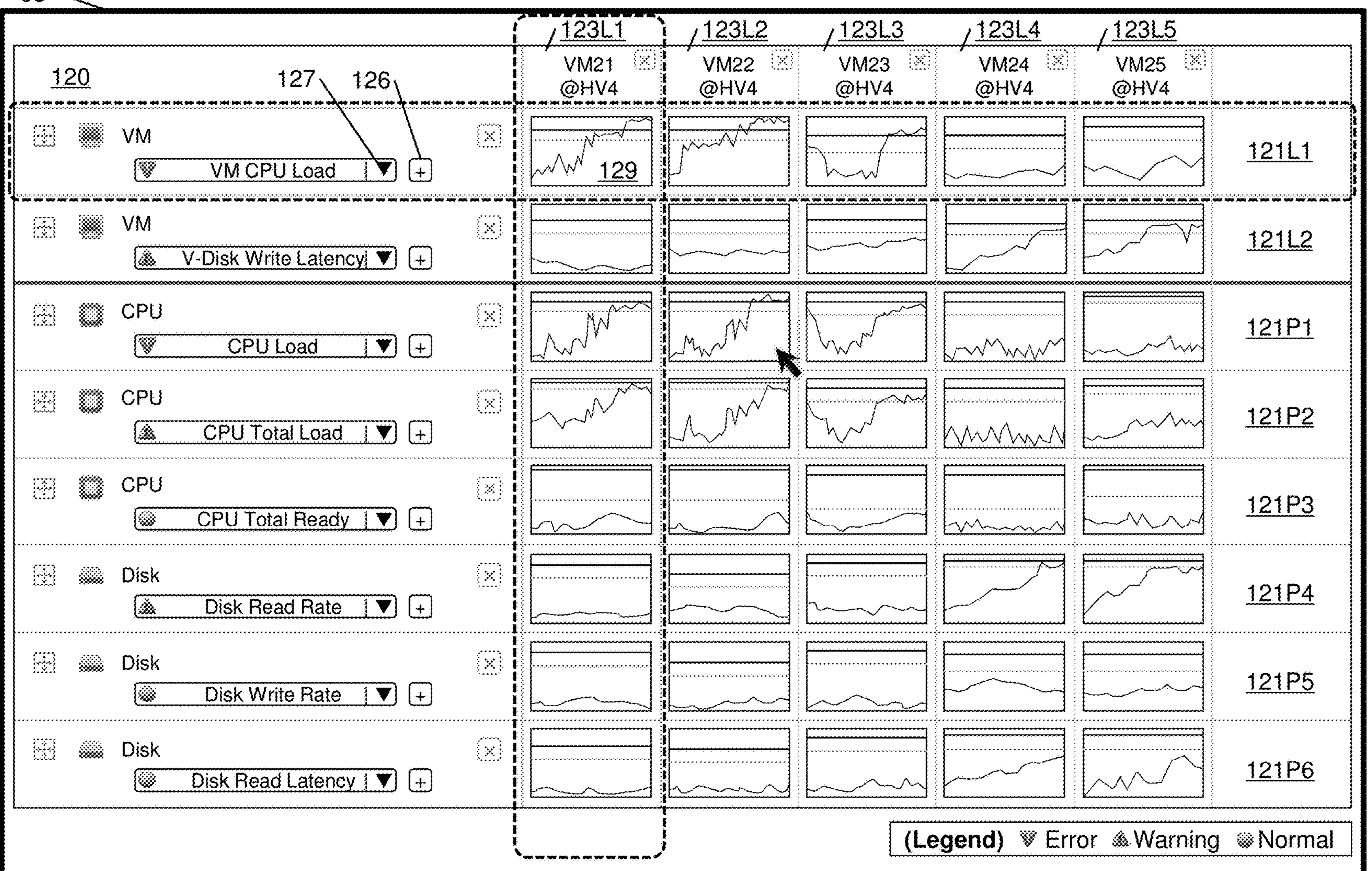
FIG. 12 shows an example of a graph table screen.

FIG. 12 shows an example of the graph table screen.

The graph table screen 53 is displayed by the graph table display module 131 in the display control program 130. An overview of the graph table screen 53 is as follows.

That is, a graph matrix 120 is displayed on the graph table screen 53. The graph matrix 120 includes the graph rows 121 and the graph columns 123, as described above. A broken-line frame is a frame that indicates the range of one graph row 121L1. A chain-line frame is a frame that indicates the range of one graph column 123L1. Typically, multiple graph rows 121 are included. However, the number of rows may be one in some cases.

A metric type corresponding to the resource type of the resource related to the base point resource is associated with the graph row 121. The base point resource (the resource adopted as the base point) is associated with the graph column 123. Multiple graphs 129 are displayed in the respective cells (multiple intersections (intersecting areas) of the graph rows 121 and the graph columns 123). That is, the graphs 129 are arranged in the column directions and the row directions. Each of the graphs 129 is an example of information that represents the time series sequence of metric values in a predetermined time zone. The metric value sequence represented by the graph 129 is a time series sequence of the metric values (the metric values of the resource related to the base point resource) of the metric type associated with the graph row 121 that includes the cell in which the graph 129 is displayed. The graph 129 is a graph related to the resource associated with the graph row that includes the cell in which the graph 129 is displayed. The graph 129 is a graph of a two-dimensional orthogonal coordinate system. In each of the graphs 129, the horizontal axis (x-axis) is a time axis, and the vertical axis (y-axis) is a numerical value axis (metric value axis). The time axes (the time zone for the display target) of all the graphs 129 are the same. On each graph row, the numerical value axes (the metric value ranges of the display targets) of all the graphs 129 are the same.

According to the graph table screen 53, two or more resources are adopted as the base points, and the metric value sequence (time series sequence) having a larger amount of information than the resource state has is regularly arranged in the row and column directions. That is, the resource display having high viewability with two or more resources adopted as base points is realized.

More specifically, for each base point resource, in the direction (here the column direction) orthogonal to the time axis, the multiple graphs 129 on the same time axis (the same time zone) (the multiple graphs 129 corresponding to multiple metric types) are arranged. For each metric type, in the direction (here the row direction) orthogonal to the numerical value axis, two or more graphs 129 on the same numerical value axis (the same numerical value range) (two or more graphs 129 corresponding to the two or more base point resources) are arranged. Accordingly, with respect to the same base point resource, the metric value sequences of multiple metric types are easily compared. With respect to the same metric type, the metric value sequences for two or more different base point resources are easily compared.

Accordingly, contribution to improvement in at least one of easiness and correctness of analysis is expected.

For example, it is assumed that a resource failure is detected in monitoring of the computer system 100 (e.g., a large scale or complicated system). In this case, even if the states of the resources are displayed in the resource table display, such as the topology display, it is not necessarily easy to identify quickly and correctly the bottleneck of a failure-detected resource. This is because the displayed resource state is only the state at a certain time point, and is only a state among the states in multiple stages. That is, the amount of information is insufficient.

There is a possibility that the bottleneck is caused by the operation situation of another resource instead of or in addition to the operation situation of the failure-detected resource.

According to the above description, it is desirable to realize resource display that displays a larger amount of information than the resource state has, with two or more resources being adopted as the base points. An example of representation that has a larger amount of information than the resource state has is a graph that represents the time series sequence of the metric value. However, the graph display according to the technique in PTL 1 described above does not present resource display having two or more resources as base points.

According to this embodiment, the resource display having high viewability with two or more resources adopted as base points is realized. With respect to the same base point resource, the user can compare the metric value sequence of multiple metric types on the same time axis (viewpoint movement along the column direction). With respect to the same metric type (the same resource type), the user can compare the metric value sequence related to two or more base point resources on the same numerical value axis (the viewpoint movement along the row direction). Accordingly, the cause of the failure is expected to be found quickly and correctly. For example, the resource adopted as the bottleneck of failure is expected to be found quickly. It can be expected to find a resource that has relatively largely affected the cause of the bottleneck among the resources of the same resource type as the failure-detected resource.

The graph table screen 53 is hereinafter described in detail.

<Graph Row>

On the graph row 121 (e.g., 121L1), information representing the metric type associated with the graph row 121 (e.g., the metric type name "VM CPU Load"), and information representing the resource type corresponding to the metric type (e.g., the resource type name "VM") are displayed.

In response to a user operation (for example, in response to press of a button 126), the display control program 130 can add the metric type of the display target with respect to the resource type corresponding to the metric type associated with the graph row 121L1. Addition of the metric type may be made to the same graph row. Alternatively, a new graph row may be added. This manner is analogously applied also to another graph row 121. In a case where the metric type of the display target is added, the display control program 130 updates the row order table 800 (more specifically, adds the metric type ID corresponding to the row number of the graph row 121, or adds a new record that includes the row number and the metric type ID). In a case where two or more metric types are associated with a single graph row 121, the display control program 130 may maintain one that is the display target among the two or more metric types, or two (or more) metric types among the two or more metric types may be adopted as the display targets. In the latter case, for example, on the graph row 121 with which two or more metric types are associated, each graph 129 includes not only a first numerical value axis (e.g., the left vertical axis) corresponding to the first metric type but also a second numerical value axis (e.g., the right vertical axis) corresponding to a second metric type.

The display control program 130 can change the metric type associated with the graph row 121L1, in response to the user operation (for example, can change the metric type to a metric type selected from a displayed menu by the user, in response to press of a pull-down button 127). Note that the selectable metric types (e.g., alternatives displayed on the pull-down menu) are one or more metric types corresponding to the resource type corresponding to the metric type associated with the graph row 121L1 but do not include metric types corresponding to another resource type. This manner is analogously applied also to another graph row 121. In a case where the metric type associated with the graph row 121 is changed, the display control program 130 updates the row order table 800 (more specifically, changes the ID of the metric type corresponding to the row number of the graph row 121 to the ID of the changed metric type).

The graph row 121 is any of a logical graph row 121L and a physical graph row 121P. Multiple graph rows 121 include at least one of the logical graph row 121L and the physical graph row 121P. In the example in FIG. 12, multiple graph rows 121 are two logical graph rows 121L (121L1 and 121L2) and six logical graph rows 121P (121P1 to 121P6). The "logical graph row" is a graph row with which the logical metric type is associated. The "logical metric type" is a metric type corresponding to the resource type of the logical resource. The "physical graph row" is a graph row with which the physical metric type is associated. The "physical metric type" is a metric type corresponding to the resource type of the physical resource.

The logical graph row 121L may exist in a case where at least one graph column 123 is a logical graph column 123L described later, for example. More specifically, for example, the metric type adopted as the logical metric type associated with the logical graph row 121L may be the metric type corresponding to the same resource type "VM" as the resource type "VM" of the logical resource associated with the logical graph column 123L. In a case where all the graph columns 123 are the physical graph columns described later, the logical graph row 121L is not required. Every logical graph row 121L is disposed higher than any physical graph row 121P. In other words, one or more logical graph rows 121L are consecutive (sequentially proximity) from the beginning graph row. This arrangement is considered to contribute to improvement in viewability. This is because the graph of the logical metric type of the logical resource that is a resource recognized by the user is disposed higher than the graph of the physical metric type of the physical resource, and such a positional relationship is the same as the resource positional relationship where the logical resource is disposed higher than the logical resource. While the resource associated with the graph column 123 is the base point resource, presence of the graph row 121 with which the metric type corresponding to the same resource type as the resource type of the base point resource is associated facilitates identification of the presence of the physical resource serving as the bottleneck of the logical resources, for example, thereby allowing improvement in one of the easiness and the correctness of analysis to be expected.

<Graph Column>

On the graph column 123 (e.g., 123L1), information (e.g., the resource name "VM21") representing the base point resource associated with the graph column 123 is displayed. In a case where the base point resource is the logical resource, information (e.g., information containing the physical resource name "@HV4") representing the physical resource on which the logical resource is based is also displayed on the graph column 123 (e.g., 123L1).

The graph column 123 is any of the logical graph column 123L and the physical graph column (not shown). That is, the multiple graph columns 123 include at least one of the logical graph column 123L and the physical graph column (not shown). In the example in FIG. 12, the multiple graph columns 123 are five logical graph columns 123L (123L1 to 123L5). The "logical graph column" is a graph column with which the logical resource is associated. The "physical graph column" is a graph column with which the physical resource is associated.

<Graph>

On the graph 129, multiple metric values corresponding to the respective acquisition time points in the time zone for the display target are plotted on the basis of the time series data table 700, and the plotted metric values are connected by lines. That is, on the graph 129, the metric value sequence (series) is represented by a polygonal line. However, the metric value sequence may be represented not by the polygonal line but by another form, such as arrangement of bars (arrangement of bars having lengths corresponding to the respective metric values).

The time zone for the display target (the time zone common to all the graphs 129) may be a time zone designated by the user or a time zone with reference to a predetermined time point. The "predetermined time point" may be a current time point, or a failure occurrence time point (a time point at which failure (e.g., Warning or Error) occurs). The "failure occurrence time point" may be a time point at which a failure occurs in the resource selected by the user, or a time point at which a failure occurs in any of one or more or two or more base point resources. The time zone may be a time zone from a reference time point (a predetermined time point serving as a reference) to a time point a predetermined time before the reference time point, a time zone from the reference time point to a time point a predetermined time after the reference time point, or a time zone from the time point from the predetermined time before the reference time point to the time point predetermined time after the reference time point.

On each graph row 121, the numerical value range for the display target may be a fixed range or a variable range. In the latter case, for example, this range may be a range defined by the display control program 130 according to the worst metric value (e.g., the maximum metric value) in the time zone for the display target and the best metric value (e.g., the minimum metric value). The numerical value range for the display target may be a range that includes both the warning threshold and the abnormal threshold for the corresponding metric type and resource type. On the graph 129, each of the warning threshold and the abnormal threshold (e.g., a line corresponding to the threshold) may be displayed.

The time zone for the display target is the same for all the graphs 129. Accordingly, even with no numerical number representing a time point in proximity to the time axis of the graph 129, it can be considered to cause no problem for the user in view of analysis. That is, even if reduction in amount of information on the display target improves the viewability, it can be considered to cause no adverse effect on the correctness of analysis.

Likewise, the numerical value range for the display target is the same for all the graph rows 121. Accordingly, even with no numerical number representing a metric value in proximity to the numerical value axis of the graph 129, it can be considered to cause no problem for the user in view of analysis. That is, even if reduction in amount of information on the display target improves the viewability, it can be considered to cause no adverse effect on the correctness of analysis.

For a certain base point resource, there is no metric value of a certain metric type in some cases. In such cases, the cell corresponding to a certain base point resource and a certain metric type may be in a state of indicating absence of any corresponding metric value (for example, blank, or a graph with no plotted data may be displayed).

<Base Point Resource>

Two or more resources adopted as the base points are, for example, at least one of the following resources corresponding to (C1) to (C4).

(C1) the resource belonging to the same resource type, (C2) the resource belonging to the same layer, (C3) the effect destination resource whose effect source resource is the same, and (C4) the resource residing in the same enclosure (presence or absence in the same enclosure can be determined by referring to a table (not shown) that holds the correspondence relationship between the enclosure ID and the resource ID, for example).

The "effect source resource" is a resource that applies an effect. The "effect destination resource" is a resource that receives an effect (e.g., an effect of performance) from the effect source resource. In a case where the effect source resource (e.g., "HV4") includes multiple resources (e.g., "CPU1", "CPU2", . . . ), and two or more effect destination resources (e.g., "VM21" to "VM26") are associated with at least one of the multiple resources, the effect source resource may be the identical effect source resource for the two or more effect destination resources.

Application/reception of the effect may be different in each view. More specifically, the effect source resource is a specific lower related resource (e.g., a child resource or a physical resource) of the effect destination resource. Alternatively, the effect source resource may be a specific higher related resource (e.g., a parent resource or a logical resource) of the effect destination resource.

An example of the effect source resource is a sharing destination resource shared by two or more resources. An example of effect destination resources is each of sharing source resources that are two or more resources sharing the sharing destination resource. For example, in a case where two or more logical resources (e.g., VM) are based on the same physical resource (e.g., any of physical resources managed by the same HV (hypervisor)), each physical resource is the sharing source resource that is an example of the base point resource. For example, in a case where two or more physical resources (e.g., physical machines) share the same logical resource (e.g., LDEV), each physical resource is the sharing source resource that is an example of the base point resource.

The base point resource may be any of the selected resource (the resource selected (typically, the resource selected by the user)), and the condition satisfying resource (the resource that satisfies a predetermined resource condition related to the selected resource and is other than the selected resource). The two or more base point resources may be only the selected resources, only the condition satisfying resources, or the selected resource and the condition satisfying resource.

According to the (C1) to (C4), the condition satisfying resource is a resource that satisfies at least one of the following (c1) to (c4).

(c1) the resource belonging to the same resource type as the selected resource, (c2) the resource belonging to the same layer as that of the selected resource, (c3) the resource whose selected resource and effect source resource (e.g., the child resource) are the same, and (c4) the resource residing in the same enclosure as that of the selected resource.

For example, (c1) may be extended such that "two or more consecutive resource types including the same resource type as the selected resource". For example, (c2) may be extended such that "the resources belonging to two or more consecutive layers including the same layer as that of the selected resource".

In this embodiment, two or more base point resources are logical resources belonging to the same resource layer. The logical resource is a resource recognized by the user, while the physical resource is not necessarily a resource recognized by the user.

<Relationship Between Graph Column (Base Point Resource) and Graph Row (Display Target Metric Type)>

The metric type adopted as the display target metric type depends on the base point resource, and more specifically, is at least one of the following (d1) and (d2).

(d1) the metric type corresponding to the resource type of the base point resource, and (d2) the metric type corresponding to the resource type of the related resource of the base point resource.

The "related resource of the base point resource" is one or both of the higher related resource of the base point resource and the lower related resource of the base point resource. More specifically, the effect source resource of the base point resource is the lower related resource, the "related resource of the base point resource" is at least the effect source resource between the effect source resource (e.g., the resource in the effect source resource) and the related resource lower than the effect source resource. On the other hand, the effect source resource of the base point resource is the higher related resource, the "related resource of the base point resource" is at least the effect source resource between the effect source resource (e.g., the resource in the effect source resource) and the related resource higher than the effect source resource.

The resource adopted as the "related resource of the base point resource" may be narrowed down according to a predetermined rule. For example, the resource adopted as the "related resource of the base point resource" may be a resource corresponding to the following (e1) or (e2).

(e1) the resource belonging to consecutive p resource types containing the same resource type as that of the base point resource (p is a natural number), and (e2) the resource belonging to consecutive q layers including the same layer as that of the base point resource (q is a natural number).

The p resource types are some of the multiple resource types. The q layers are some of the multiple layers.

Figure 13:
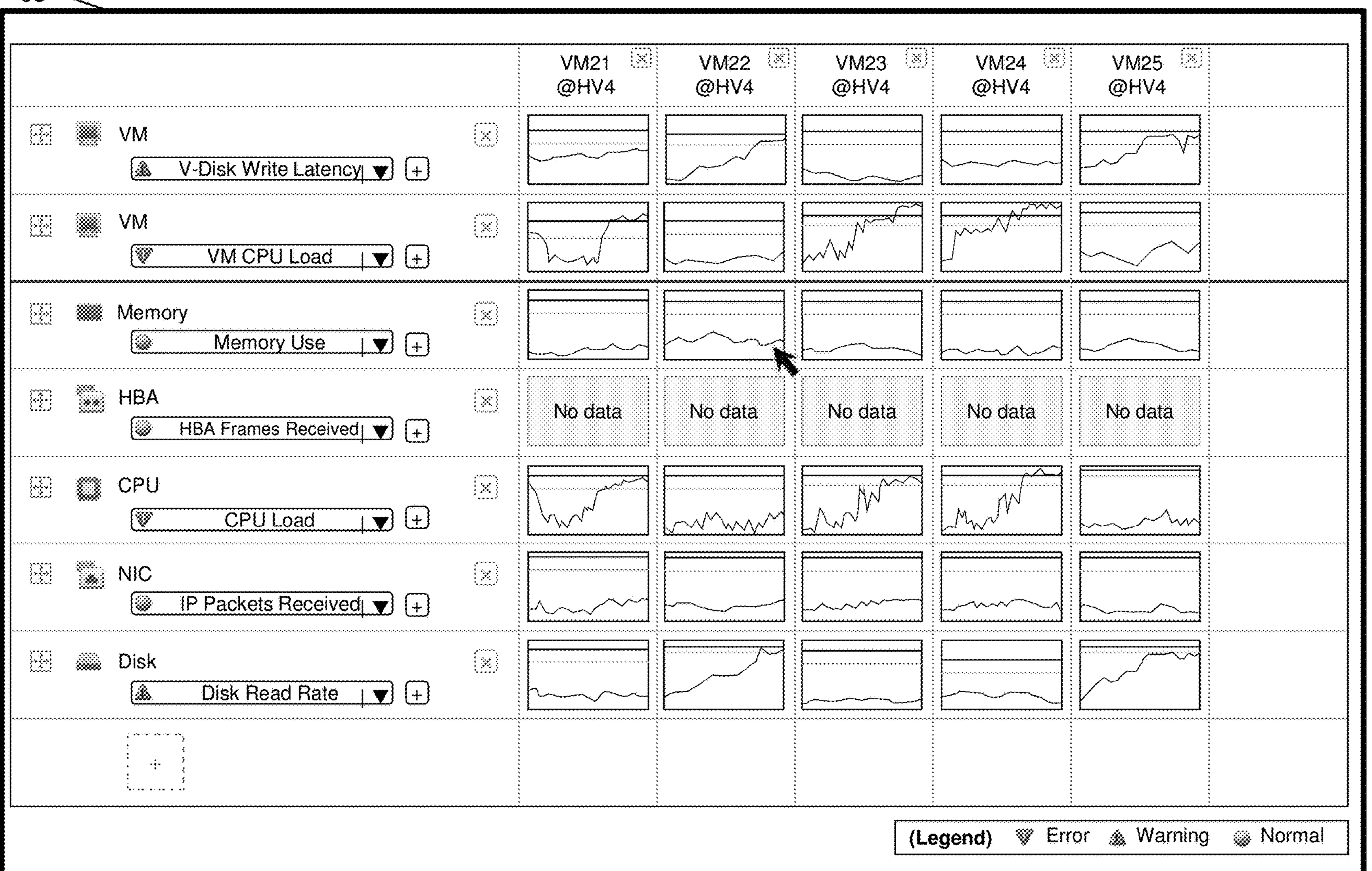
FIG. 13 shows an example of a graph table screen after a metric type narrowing-down process and a graph row permutation.
Figure 14:
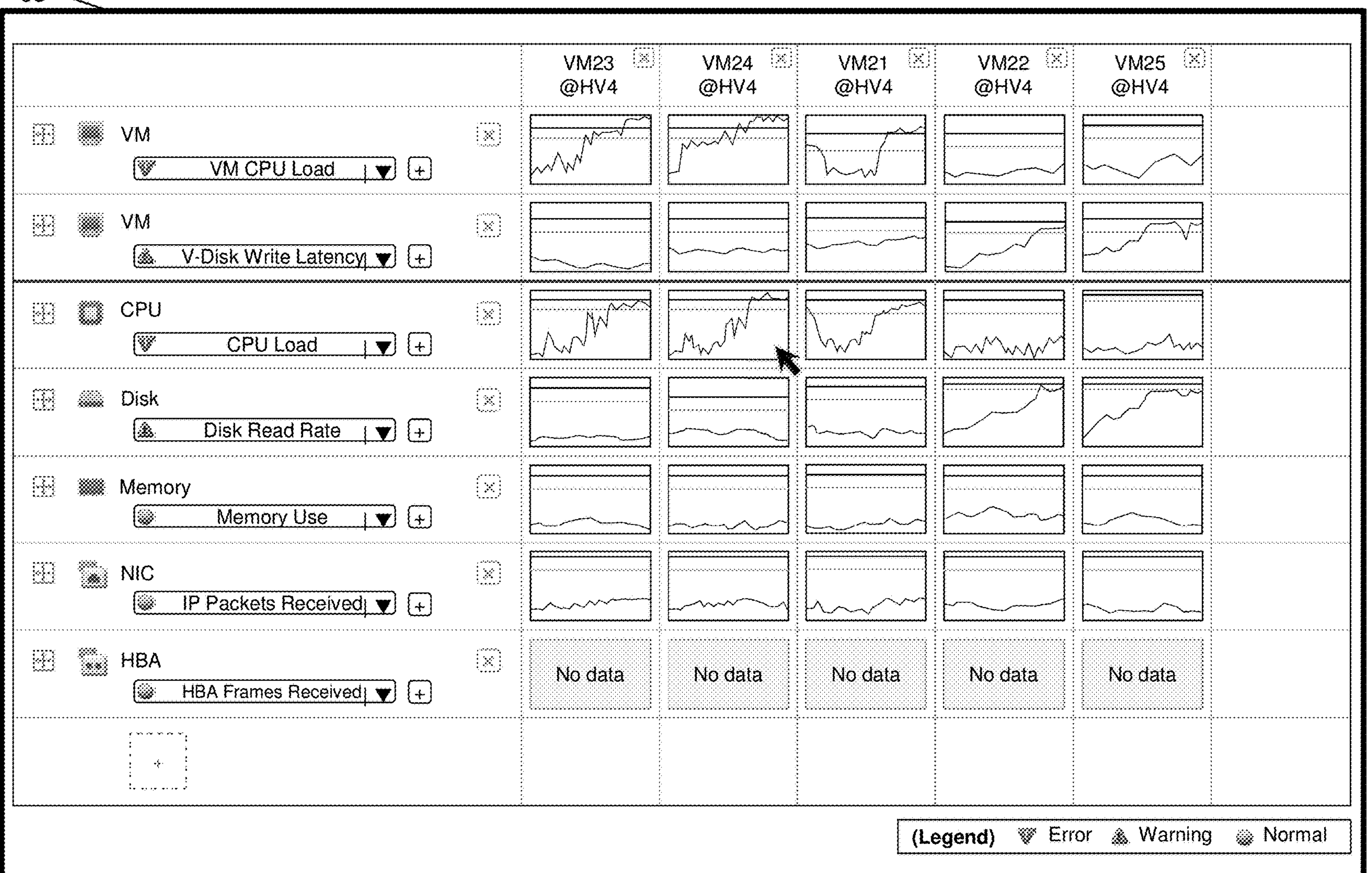
FIG. 14 shows an example of a graph table screen after graph column permutation.
Figure 15:
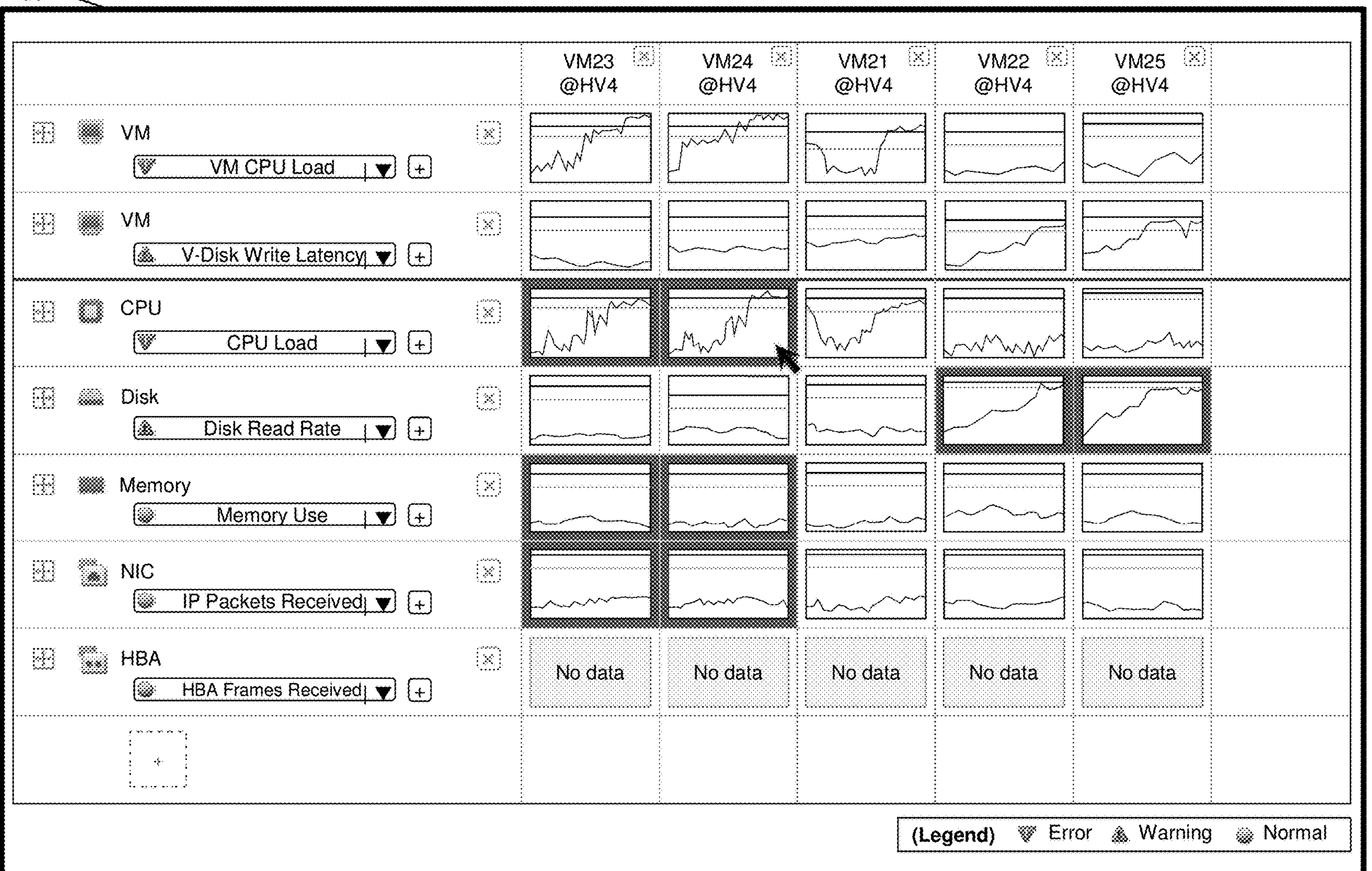
FIG. 15 shows an example of a graph table screen after a highlight display process.

The number of metric types serving as display targets with respect to one resource type may be two or more as exemplified in FIG. 12. Alternatively, the number may be one as exemplified in FIGS. 13 to 15. In FIGS. 13 to 15, on the graph row corresponding to the metric type of the resource type "HBA", "No Data" means that there is no time series metric value.

<Display of Detailed Information>

When a user operation of designating the graph 129 is performed (for example, a mouse cursor 124 is overlaid on the graph 129), the display control program 130 displays, on the graph table screen 53 (by a pop-up screen, for example), detailed information (e.g., the related resource name) on the resource related to the base point resource among the resources of the resource type corresponding to the metric type corresponding to the designated graph 129.

When a user operation of designating the base point resource is performed (for example, a case where the mouse cursor 124 is overlaid on the base point resource name), the display control program 130 displays, on the graph table screen 53 (by a pop-up screen, for example), the detailed information on the resource related to the designated base point resource (for example, the name of the related resource of the resource type corresponding to the display target metric type among the resources related to the base point resource).

<Permutation of Graph Rows and Graph Columns>

The display control program 130 permutes the graph rows 121 (see FIG. 13). More specifically, for example, in response to the user operation, the display control program 130 inserts the designated graph row 121 into a designated position (for example, inserts the dragged graph row 121 into a dropped position). Note that the consecution (sequentially proximity) of the logical graph rows 121L, and the consecution of the physical graph rows 121P may be maintained. That is, insertion of the physical graph row 121P between the logical graph rows 121L, and insertion of the logical graph row 121L between the physical graph rows 121P may be prohibited by the display control program 130. FIG. 13 shows an example of a screen after the graph table screen of FIG. 12 is displayed, and is an example of a screen as a result of the metric type narrowing-down process in response to the user operation. That is, according to FIG. 13, the display target metric types in FIG. 12 are narrowed down. The details of the metric type narrowing-down process are described in Embodiment 2.

The display control program 130 permutes the graph columns 123 (see FIG. 14). More specifically, for example, in response to the user operation, the display control program 130 inserts the designated graph column 123 into a designated position (for example, inserts the dragged graph column 123 into a dropped position).

Accordingly, the user can cause the separated graph rows 121 to be adjacent to each other, and cause the separated graph columns 123 to be adjacent to each other, in a desired view. As a result, the graphs 129 intended to be compared are adjacent to each other. This arrangement contributes to improvement in at least one of the correctness and easiness of analysis (for example, the user can easily find the bottleneck).

<Clear Presentation of Base Point Resources Having the Same Related Resource>

The physical graph row 121P is an example of the graph row 121 corresponding to the resource type of the related resource of the base point resource. As for each physical graph row 121P, when the related resource related to multiple base point resources reside among the related resources of the resource type corresponding to the physical graph row 121P, the highlight display module 132 in the display control program 130 clearly presents the multiple base point resources. More specifically, for example, as for the physical graph row 121P, the highlight display module 132 displays, in a highlighted manner, the multiple graphs 129 (or cells) corresponding to the respective base point resources that share the identical related resource of the resource type corresponding to the physical graph row 121P. The highlight display described here may be adoption of an outer frame of the graph 129 (or cell) displayed with thick lines, or adoption of a predetermined color on the background of the graph 129. Other types of aspects may be adopted as aspects of highlight display.

An example of the details of the highlight display process is as follows. The highlight display module 132 refers to tables 400, 500, 550, 600, 800 and 900, and determines, for each physical graph row 121P, whether or not there is a physical resource that is of the resource type corresponding to the metric type on the physical graph row 121P and is related to multiple base point resources. If there is such a physical resource, the highlight display module 132 displays, in a highlighted manner, the multiple graphs 129 that are present on the physical graph row 121P and correspond to the multiple base point resources. The highlight display, may be performed in response to the user operation after the graph table screen 53 is displayed, and may be displayed on the displayed graph table screen 53.

<Process Flow>

Figure 16:
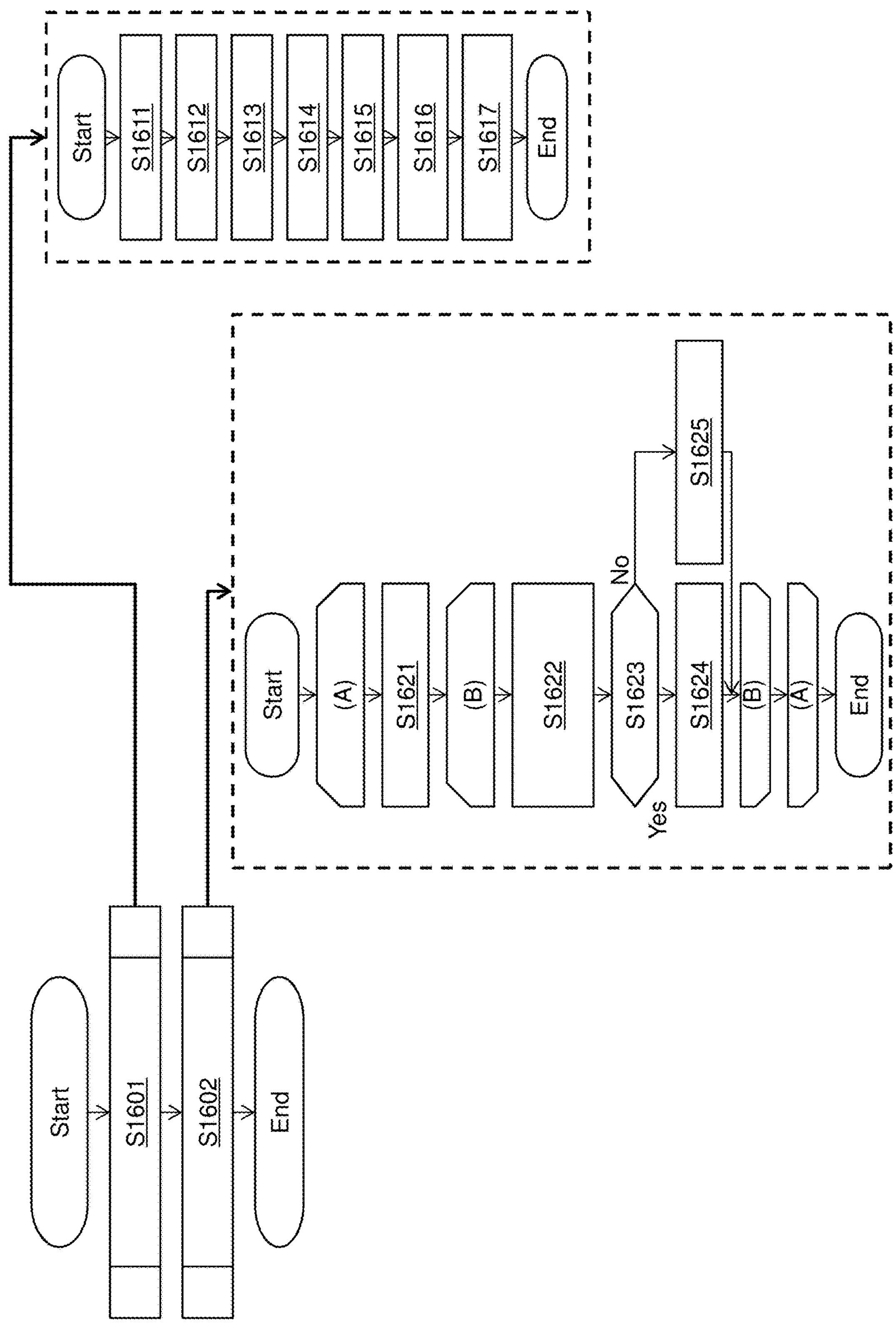
FIG. 16 shows a graph table display process according to Embodiment 1.

FIG. 16 shows a graph table display process according to Embodiment 1.

In S1601, a graph configuration acquisition process is performed. In S1602, a graph table drawing process is performed.

The graph configuration acquisition process in S1601 is a process including the following S1611 to S1617.

In S1611, the graph table display module 131 accepts a resource selection from the user through the resource selection screen, such as the topology screen 51, for example. Hereinafter, for facilitating the comprehensibility of description, it is assumed that the selected resource is the resource "VM21" in FIG. 11.

In S1612, the graph table display module 131 identifies the child resource "HV4" belonging to the same layer "Server" as that of the selected resource "VM21" on the basis of the tables 400, 500 and 550.

In S1613, the graph table display module 131 identifies the related resources belonging to the same layer as that of the child resource "HV4" identified in S1612 on the basis of the tables 400, 500 and 550. The identified related resource may be higher than the child resource or lower than the child resource. Here, the resources "VM22", "VM23", "VM24" and "VM25", which are the parent resource of the resource "HV4" and are other than the selected resource "VM21" are identified as the related resource. Furthermore, the child resource "DS3" of the resource "HV4" is identified as the related resource.

In S1614, the graph table display module 131 assigns the column numbers to the respective logical resources among the multiple resources identified in S1611 to S1613, on the basis of the tables 400 and 550, and registers the combinations of the column number and the resource ID of the respective logical resources in the column order table 900.

That is, in S1614, the resources associated with the graph columns (in other words, the resources displayed as the graph columns), i.e., the base point resources, are determined. Alternatively, the base point resources may be determined as the selected resources and the condition satisfying resources, without the process in S1614. The "condition satisfying resources" described here may be resources whose selected resource and child resource are the same and are of the same resource type as that of the selected resource. At any rate, in S1614, the resources "VM21" to "VM25" are determined as the base point resources.

In S1615, the graph table display module 131 identifies the metric type corresponding to the resource type on the basis of the tables 400 and 600, with respect to each of the resources identified in S1611 to S1613.

In S1616, the graph table display module 131 assigns the row numbers to the respective logical metric types (the metric types corresponding to the resource types of the logical resources) among the multiple metric types identified in S1615, on the basis of the tables 400, 550 and 600, and registers the combinations of the row number and the metric type ID of the respective logical metric types in the row order table 800.

In S1617, the graph table display module 131 assigns the row numbers to the physical metric types (the metric types corresponding to the respective resource types of the physical resources) among the multiple metric types identified in S1615, on the basis of the tables 400, 550 and 600, and registers the combinations of the row number and the metric type ID of the respective physical metric types in the row order table 800. The smallest row number with respect to the physical metric type is a number obtained by adding one to the largest row number with respect to the logical metric type.

That is, in S1615 to S1617, the metric types associated with the graph rows (the metric types to be displayed as the graph rows) are determined. Here, if multiple metric types are present for one resource type, multiple graph rows corresponding to the respective metric types are prepared. Here, the metric type serving as the display targets are the metric type corresponding to the resource type "VM" of the selected resource, the metric types corresponding to the resource types (e.g., "CPU", "DISK", etc.) of the resources in the child resource "HV4" of the selected resource, and the metric type corresponding to the resource type of the child resource "DS3" of the resource "HV4".

The graph table drawing process in S1602 is a process that includes the next loops (A) and (B) and the following S1621 to S1625.

The loop (A) indicates execution of the loop (B) and the following S1621 to S1625, for each of the column number "1" to the end in the column order table 900. Hereinafter, one column number (hereinafter called "column number Q" for the sake of convenience) is exemplified.

In S1621, the graph table display module 131 identifies the resource ID related to the resource ID corresponding to the column number Q on the basis of the table 500.

The loop (A) indicates execution of the following S1622 to S1625, for each of the row number "1" to the end in the row order table 800. Hereinafter, one row number (hereinafter called "row number P" for the sake of convenience) is exemplified.

In S1622, the graph table display module 131 identifies the warning threshold and the abnormal threshold that correspond to the resource ID identified in S1621 and the metric type ID corresponding to the row number P, and the metric value corresponding to the acquisition time point (the resource ID identified in S1621) belonging to the time zone for the display target, on the basis of the tables 700, 800 and 1000.

In S1623, the graph table display module 131 determines whether the time series metric values are present or not.

If the determination result in S1623 is true, the graph table display module 131 draws the graph 129 that represents the time series sequence of the metric value in the cell corresponding to the row number P and the column number Q in S1624.

If the determination result in S1623 is false, the graph table display module 131 draws an object (e.g., the character string "No data") that represents absence of the time series metric value, in the cell corresponding to the row number P and the column number Q in S1625.

Embodiment 2

In Embodiment 2, a graph table screen that has the arrangement orders of the display target metric types and the graph rows and the graph columns are automatically optimized is displayed. More specifically, for example, in Embodiment 1, the screen after resource selection is the screen 53 in FIG. 12. The screen 53 in FIG. 15 is acquired by the user manually permuting the graph rows and the graph columns (with or without application of the highlight display process). In Embodiment 2, the screen after the resource selection is the screen 53 in FIG. 15.

Hereinafter, Embodiment 2 is described in detail. In this case, the different points from those in Embodiment 1 are mainly described. The points common to those in Embodiment 1 are omitted or simplified.

Figure 17:
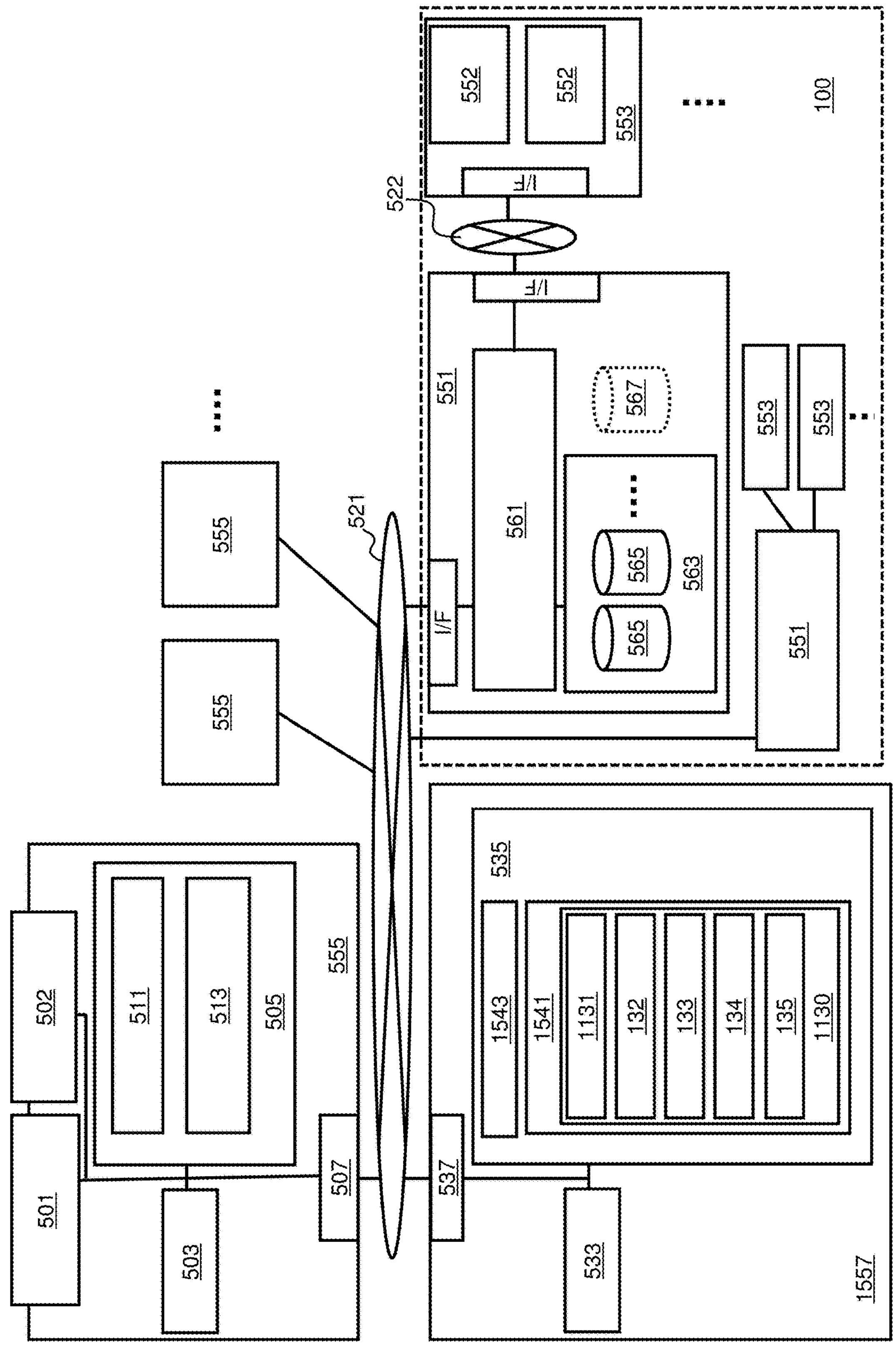
FIG. 17 shows configurations of a computer system and a management system according to Embodiment 2.

FIG. 17 shows configurations of a computer system and a management system according to Embodiment 2.

The management server program 1541 includes a display control program 1130 that executes display control. The display control program 1130 includes not only a graph table display module 1131 and the highlight display module 132, but also a score calculation module 133 that calculates the time series score, a metric type narrowing-down module 134 that narrows down the display target metric types, and a permutation module 135 that permutes at least one of the graph rows and the graph columns. In this embodiment, processes that are performed by the display control program 1130 and are other than the processes performed by the modules 132 to 135, are performed by the graph table display module 1131.

A management table group 1543 includes a time series score table, besides the tables shown in FIGS. 3 to 10.

FIG. 18 shows an example of the time series score table.

The time series score table 1800 includes information related to the time series score. The time series score table 1800 includes, for example, records for the respective combinations of the resources and the metric types. Each record includes the resource ID, the metric type ID, the worst metric value (the worst metric value in the time zone for the display target), and the time series score (the calculated time series score). The "time series score" is the score of the time series sequence in the time zone for the display target, and more specifically, is a score based on at least one value among the multiple metric values acquired at the acquisition time points belonging to the time zone for the display target. In this embodiment, the time series score is a score based on the worst metric value. The time series score is calculated for each combination of the resource and the metric type.

In Embodiment 2, the display target metric types, the arrangement order of the graph rows, and the arrangement order of the graph columns are automatically optimized on the basis of the time series score. The graph table screen as a result of the optimization is displayed.

Figure 21:
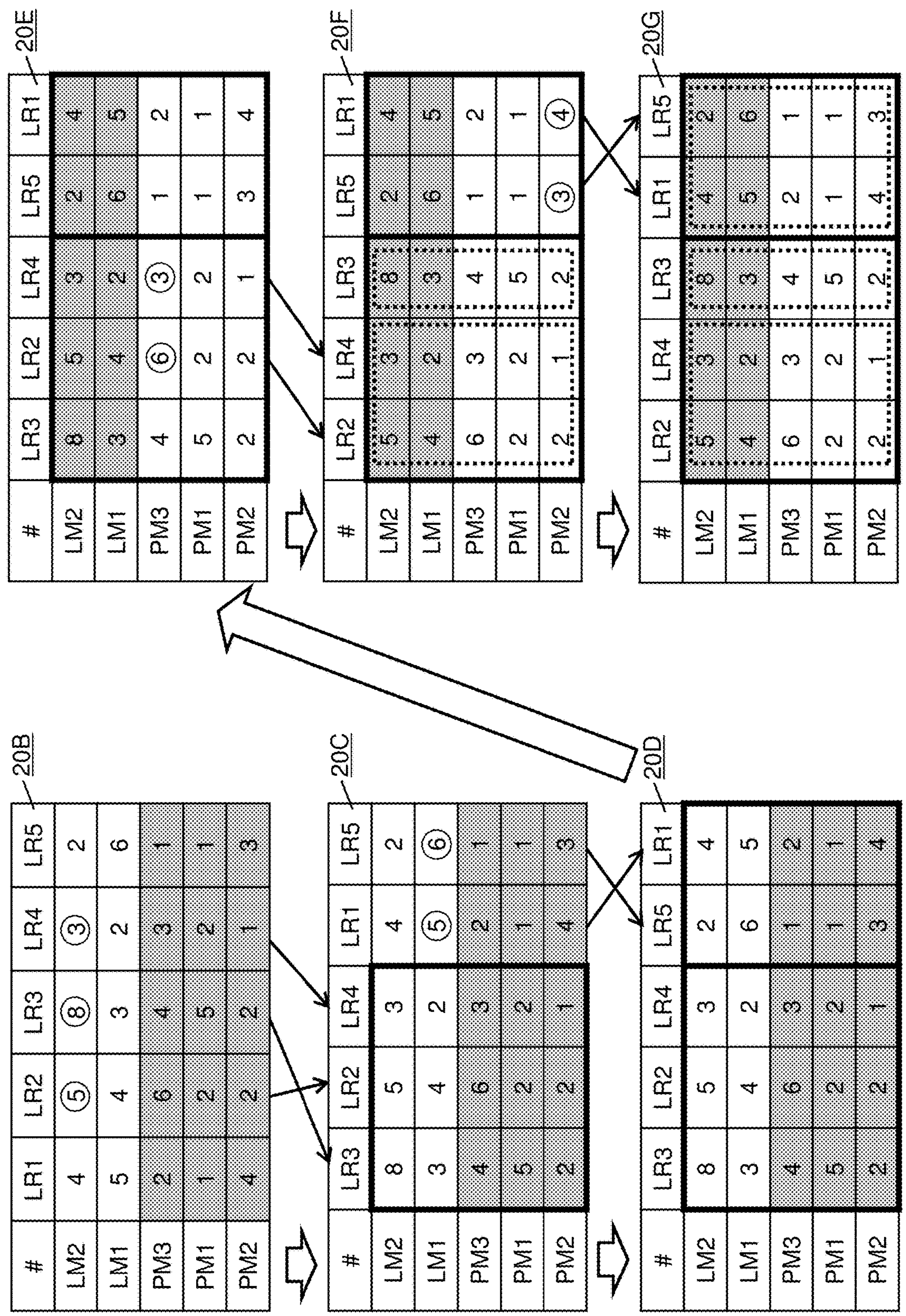
FIG. 21 is a diagram illustrating a graph column permutation process.
Figure 22:
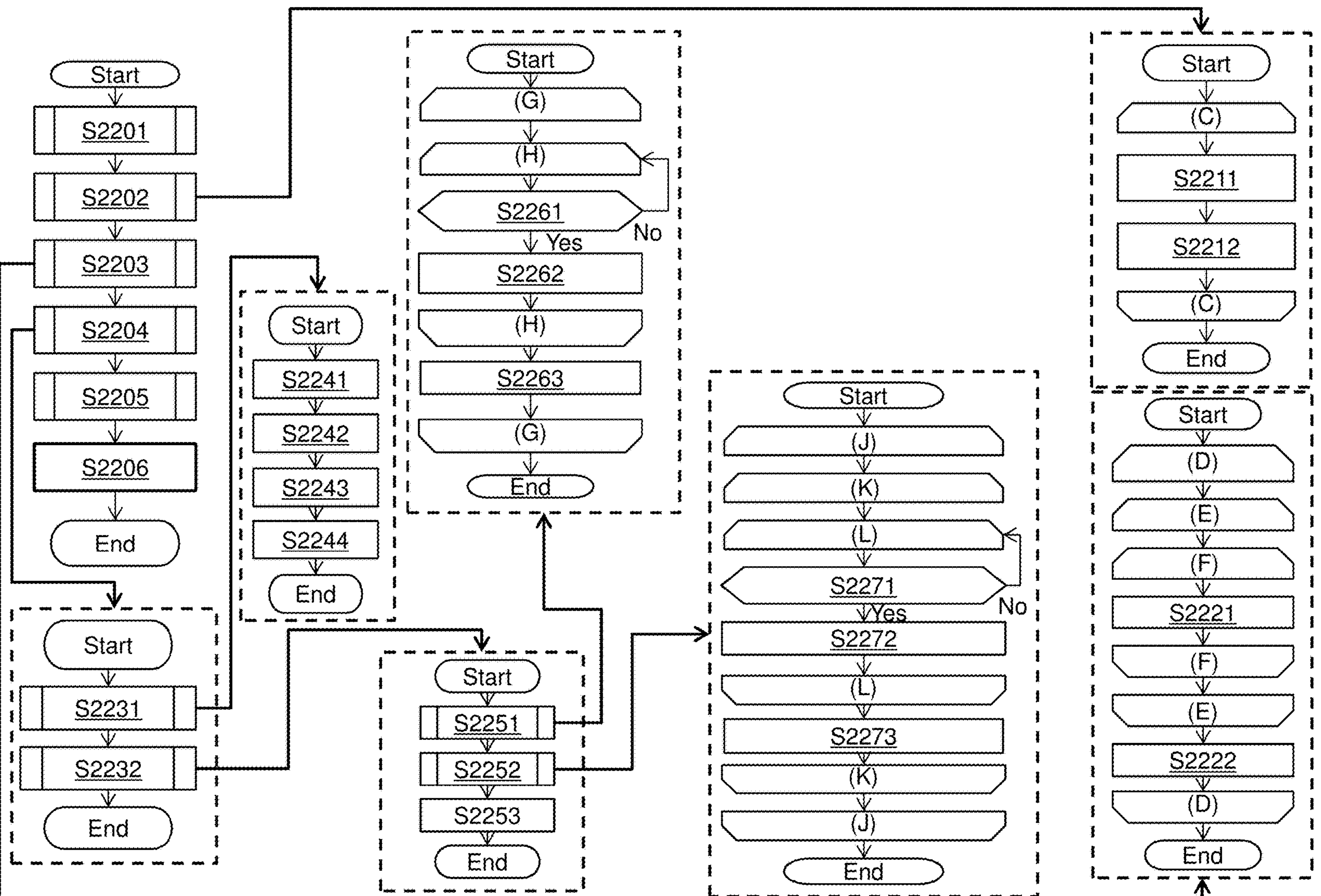
FIG. 22 shows a graph table display process according to Embodiment 2.

FIG. 22 shows a graph table display process according to Embodiment 2. Appropriately referring to FIGS. 19 to 22 in addition to FIG. 22, the graph table display process according to this embodiment is described.

In S2201, a graph configuration acquisition process analogous to that in Embodiment 1 is performed. In S2202, a time series score calculation process is performed. In S2203, the metric type narrowing-down process is performed. In S2204, an order permutation process is performed. In S2205, a graph table drawing process analogous to those in Embodiment 1 is performed. In S2206, a highlight display process analogous to that in Embodiment 1 is performed.

Hereinafter, the time series score calculation process, the metric type narrowing-down process, and the order permutation process, which are specific to Embodiment 2, are described.

<Time Series Score Calculation Process>

The time series score calculation process in S2202 is a process that includes a loop (C) and S2211 and S2212.

The loop (C) indicates execution of S2211 and S2212 for each of the metric types determined in S1615 to S1617, which are the graph configuration acquisition process. The metric types determined in S1615 to S1617 are the display target metric types in Embodiment 1, but are candidate metric types in Embodiment 2. The multiple candidate metric types are narrowed down into two or more display target metric types by the metric type narrowing-down process described later. Hereinafter, in the following description of the time series score calculation process, one of the candidate metric types is exemplified (hereinafter a target candidate metric type).

In S2211, the score calculation module 133 calculates the time series score from the worst metric value corresponding to each resource corresponding to the target candidate metric type on the basis of the table 700. The "worst metric value" described here is an example of the resource value. The "resource value" is a value based on at least one value among the metric values obtained at the respective acquisition time points belonging to the time zone for the display target. Instead of or in addition to the "worst metric value", the resource value may be the average value of the multiple metric values belonging to the time zone for the display target. The higher the worst metric value is, the higher the time series score tends to be. For example, the time series score is calculated on the basis of the worst metric value and its threshold (e.g., at least one of the warning threshold and the abnormal threshold). More specifically, for example, the time series score=(worst metric value/abnormal threshold)×100.

In S2212, the score calculation module 133 registers the time series score calculated in S2211, the worst metric value based on the time series score, the resource ID of the resource corresponding to the time series score, and the metric type ID of the candidate metric types corresponding to the time series score, in the time series score table 1800.

<Metric Type Narrowing-Down Process>

The metric type narrowing-down process in S2203 is a process that includes loops (D), (E) and (F) and S2221 and S2222.

The loop (D) indicates execution of the loops (E) and (F) and S2221 and S2222 for each resource type corresponding to the candidate metric types. Hereinafter, one resource type (called "target resource type" in the description of the metric type narrowing-down process) is exemplified.

The loop (E) indicates execution of the loop (F) and S2221 for the target resource type, with respect to each candidate metric type corresponding to the resource type.

The loop (F) indicates execution of S2221 for each base point resource.

In S2221, the metric type narrowing-down module 134 identifies the time series scores that correspond to the base point resource or the related resource of the base point resource and to the candidate metric types, in the time series score table. The metric type narrowing-down module 134 updates the aggregation score on the basis of the identified time series scores. The "aggregation scores" are scores for the respective combinations of the base point resource and the candidate metric type and are values (e.g., the total of the time series scores) based on the time series score corresponding to the base point resource and its related resource among the resources corresponding to the candidate metric types. FIG. 19 shows an example of an aggregation result of the target resource type (a result of S2221). FIG. 19 illustrates aggregation scores for each of the candidate metric types (the metric type IDs "1" to "3") with respect to each of the base point resources (LR1 to LR5). For example, the aggregation score corresponding to the base point resource (LR1) and the candidate metric type (the metric type ID "1") is "120".

In S2222, the metric type narrowing-down module 134 determines, as the display target metric type, the metric type corresponding to at least one of one or more score conditions (conditions related to the aggregation score) from the aggregation result of the target resource type. For example, in a case where the first score condition is the "maximum aggregation score", according to the example in FIG. 19, the maximum aggregation score is "150" (the score in the gray cell in FIG. 19), and accordingly the display target metric type is the metric type 2 (the metric type with ID "2") corresponding to the maximum aggregation score "150". For example, in a case where the second score condition is "the aggregation score 100", according to the example in FIG. 19, the aggregation scores satisfying this condition are "110", "120" and "150" (the score encircled in FIG. 19), and accordingly, the display target metric types are the metric type 1 having the aggregation score "120", and the metric type 2 having the aggregation scores "110" and "150".

The first score condition is an example of a relative condition. The second score condition is an example of an absolute condition. The score condition is at least one of the relative condition and the absolute condition. For example, in a case where it is determined that a predetermined number (e.g., one) of metric types serves as the display target for one resource type, the relative condition may always be adopted, or the absolute condition may be adopted until a predetermined number or less of metric types are determined, and the relative condition may be adopted when the number of metric type is less than the predetermined number.

<Order Permutation Process is Performed>

The order permutation process in S2204 is a process that includes a row permutation process in S2231 and a column permutation process in S2232. Hereinafter, in the description of the order permutation process, FIGS. 20 and 21 are appropriately referred to. The aggregation scores listed in FIGS. 20 and 21 do not correspond to the aggregation scores listed in FIG. 19. That is, the aggregation scores listed in FIGS. 20 and 21 are examples for facilitating understanding of the order permutation process, and are examples different from the aggregation score example listed in FIG. 19.

<<Row Permutation Process>>

The row permutation process in S2231 is a process that includes S2241 to S2244. In the description of the row permutation process, FIG. 20 is appropriately referred to.

In S2241, the permutation module 135 calculates a representative score for each graph row (for each display target metric type). For each graph row, the "representative score" is a score based on one of two or more aggregation scores (two or more aggregation scores corresponding to two or more base point resources) corresponding to the graph row, for example, the maximum value or average value of the aggregation scores. Here, the representative score is the maximum value among the two or more aggregation scores. Reference sign 20A in FIG. 20 denotes one example of an aggregation score matrix at a time of starting of the row permutation process. The aggregation score matrix is a table of the aggregation scores corresponding to the graph rows and graph columns, and is deployed in the storage resource 535, for example. According to reference sign 20A, for each graph row, the maximum value of the aggregation scores is encircled. In FIG. 20, "LR" is an abbreviation of the logical resource (base point resource). The "LM" is an abbreviation of the logical metric type. The "PM" is an abbreviation of the physical metric type.

In S2242, the permutation module 135 sorts the logical graph rows in a descending order of the representative score. In S2243, the permutation module 135 sorts the physical graph rows in a descending order of the representative score. As results of S2242 and S2243, the graph row arrangement indicated by reference sign 20A in FIG. 20 becomes the graph row arrangement indicated by reference sign 20B in FIG. 20. That is, the arrangement order of the logical graph rows is changed from LM1→LM2 to LM2→LM1, and the arrangement order of the physical graph rows is changed from PM3→PM4→PM5 to PM5→PM3→PM4. Every logical graph row is maintained above any of the physical graph rows.

In S2244, the permutation module 135 updates the row order table 800 (updates the row number corresponding to the metric type ID) on the basis of the results of S2242 and S2243.

<<Column Permutation Process>>

The column permutation process in S2232 is a process that includes S2251 and S2252, that is, a two-stage process. S2251 is a first-stage column permutation. S2252 is a second-stage column permutation. In S2253, the permutation module 135 updates the column order table 800 (updates the row number corresponding to the metric type ID) on the basis of the results of S2251 and S2252.

Hereinafter, the first-stage column permutation and the second-stage column permutation are described. In the description, FIG. 21 is appropriately referred to. In the following description, the set of logical graph rows is called a "logical graph row group", and the set of physical graph rows is called a "physical graph row group".

<<<First-Stage Column Permutation>>>

S2251 (the first-stage column permutation) is a process corresponding to the arrangement of the logical graph rows, and includes loops (G) and (H) and S2261 to S2263. In the description of the first-stage column permutation, reference signs 20B to 20D in FIG. 21 are referred to. The first-stage column permutation considers the logical graph rows but does not consider the physical graph rows (accordingly, for reference signs 20B to 20D, the color of the physical graph rows is gray). Reference sign 20B is the aggregation score matrix at the time of end of the row permutation process.

The loop (G) indicates execution of the loop (H) and S2261 to S2263 for each logical graph row. One logical graph row is exemplified (in the description of the first-stage column permutation, the row is called "target logical graph row").

The loop (H) indicates execution of S2261 and S2262 for each graph column. One graph column in a non-fixed graph column group is exemplified (in the description of the first-stage column permutation, the column is called "target graph column"). The "non-fixed graph column group" is one or more graph columns that are not fixed (are movable). Meanwhile, a "fixed graph column group" described later is one or more graph columns that are fixed (are not movable). At start of the first-stage column permutation (at the end of the row permutation process), all the graph columns are non-fixed graph columns.

In S2261, the permutation module 135 determines whether or not the target aggregation score (the aggregation score corresponding to the target logical graph row and the target graph column) is the maximum value among the aggregation scores that are present in the range corresponding to the logical graph row group and the target graph column. According to reference sign 20B in FIG. 21, on the target logical graph row (LM2), the aggregation scores whose determination results in S2261 are affirmative (that is, the aggregation scores higher than the aggregation scores on the other logical graph rows (LM1), on the same graph column) are encircled.

In a case where the determination result in S2261 is affirmative, the permutation module 135 moves the target graph column to the leftmost in S2262. If graph columns having already been moved are present, the permutation module 135 permutes the two or more moved graph columns in a descending order of the aggregation score on the target logical graph row.

In S2263, if the graph columns having been moved are present, the permutation module 135 regards the graph columns as "fixed graph column group". When S2261 to S2263 are completed for the first logical graph row (LM2), the matrix 20B is changed to the matrix 20C. In the matrix 20C, the first to third graph columns encircled by thick lines (LR3, LR2 and LR4) are a fixed graph column group X.

Also to the second logical graph row (LM1), S2261 to S2263 are performed. As a result, the matrix 20C is changed to the matrix 20D. In the matrix 20D, the fourth and fifth graph columns encircled by thick lines (LR5 and LR1) are a fixed graph column group Y.

<<<Second-Stage Column Permutation>>>

S2252 (the second-stage column permutation) is a process corresponding to the arrangement of the physical graph rows, and includes loops (J), (K) and (L) and S2271 to S2273. In the description of the second-stage column permutation, reference signs 20E to 20G in FIG. 21 are referred to. The second-stage column permutation considers the physical graph rows but does not consider the logical graph rows (accordingly, for reference signs 20E to 20G, the color of the logical graph rows is gray). Reference sign 20E is the aggregation score matrix at the time of end of the first-stage row permutation process. The first to third graph columns (LR3, LR2 and LR4) are the fixed graph column group X. The fourth and fifth graph columns (LR5 and LR1) are the fixed graph column group Y.

The loop (J) indicates execution of the loops (K) and (L) and S2271 to S2273 are performed for each fixed graph column group. One fixed graph column group is exemplified. In the process, the fixation is released. Accordingly, the exemplified graph column group is called "target graph column group" in the description of the second-stage column permutation.

The loop (K) indicates execution of the loop (L) and S2271 to S2273 for each physical graph row. One physical graph row is exemplified (in the description of the second-stage column permutation, the row is called "target physical graph row").

The loop (L) indicates execution of S2271 and S2272 for each graph column in the target graph group. One graph column in a non-fixed graph column group is exemplified (in the description of the first-stage column permutation, the column is called "target graph column").

In S2271, the permutation module 135 determines whether or not the target aggregation score (the aggregation score corresponding to the target physical graph row and the target graph column) is the maximum value among the aggregation scores that are present in the range corresponding to the physical graph row group and the target graph column. According to reference sign 20E in FIG. 21, on the target physical graph row (PM3), the aggregation scores whose determination results in S2271 are affirmative (that is, the aggregation scores higher than the aggregation scores on the other logical graph rows (PM1 and PM2), on the same graph column) are encircled. S2271 is performed for the first graph column group X in the first-stage column permutation (i.e., the graph column group that includes the leftmost first to third graph columns (LR3, LR2 and LR4)), in an ascending order of the row number (i.e., the order of physical graph rows (PM3), (PM1) and (PM2)). If the determination result in S2271 is affirmative, S2272 and S2273 are performed.

In S2272, the permutation module 135 moves the target graph column to the leftmost. If graph columns having already been moved are present, the permutation module 135 permutes the two or more moved graph columns in a descending order of the aggregation score on the target physical graph row.

In S2273, if the graph columns having been moved are present, the permutation module 135 regards the graph columns as "fixed graph column group".

When S2271 to S2273 are completed for the first graph row group X, the matrix 20E is changed to the matrix 20F. In the matrix 20F, the first and second graph columns (LR2 and LR4) encircled by broken lines are a fixed graph column group x1, and the third graph column (LR3) encircled by a broken line is a fixed graph column group x2.

S2271 is performed also for the second graph column group Y in the first-stage column permutation (i.e., the graph column group that includes the fourth and fifth graph columns (LR5 and LR1)), in an ascending order of the row number (i.e., the order of physical graph rows (PM3), (PM1) and (PM2)). If the determination result in S2271 is affirmative, S2272 and S2273 are performed. As a result, the matrix 20F is changed to the matrix 20G.

A graph table screen as a result of the metric type narrowing-down process, the graph row permutation process, and the graph column permutation process, which have been described above, is displayed. That is, in Embodiment 2, the screen after resource selection is not the screen 53 in FIG. 12 but the screen 53 in FIG. 15 instead. That is, the arrangement orders of the display target metric types and the graph rows and the graph columns are automatically optimized. Accordingly, further contribution to improvement in at least one of easiness and correctness of analysis is expected. At least one of the graph row permutation and the graph column permutation can be manually performed to the screen 53 in FIG. 15.

According to the description of Embodiment 2, the followings hold.

The time series score is a value obtained by normalizing the worst metric value (one example of the resource value based on at least one of multiple metric values belonging to the time zone for the display target). The worse the metric value is, the higher the time series score tends to be. Both determination of the display target graph (metric type narrowing-down) and graph permutation are performed on the basis of the time series score. Instead of or in addition to the worst metric value, the resource value may be a time length during which the metric value exceeds the threshold (e.g., the abnormal threshold or the warning threshold) in the time zone for the display target. In this case, for example, even if the worst metric value is low, when a long time length during which the warning threshold is exceeded, the time series score can be high.

A metric type with at least one of aggregation scores is high, tends to be determined as the display target. In such view, the metric type corresponding to a bad metric value tends to be determined as the display target. That is, the graph corresponding to a bad metric value tends to be determined as the display target.

In the graph row permutation, the higher the representative score is, the more upward the graph row tends to be arranged (the smaller the row number to be assigned). In the graph column permutation, the higher the aggregation score is, the more upward the graph column tends to be arranged (the smaller the column number to be assigned). The representative score is an example of the score based on at least one of two or more aggregation scores corresponding to the same metric type. The higher the aggregation score on which the representative score is based is, the higher the representative score tends to be. Consequently, the condition satisfying graphs are expected to be adjacent to each other in at least one of the row direction and the column direction. The "condition satisfying graph" is a graph where the score (the score calculated on the basis of the metric value), such as the representative score or the aggregation score, corresponds to a predetermined score condition. The condition satisfying graph may be, for example, a graph satisfying at least one of the following conditions (x1) to (x2) in the time zone for the display target (the condition defined such that the metric value is bad in the time zone for the display target).

(x1) consecutive W metric values exceeding the threshold (e.g., the abnormal threshold) are acquired (W is a natural number), and (x2) consecutive w metric values which are less than the threshold and whose differences from the threshold are equal to or less than a predetermined value are acquired (w is a natural number and w>W).

In both of a case where (x1) is satisfied and a case where (x2) is satisfied, at least one of the time series score, the aggregation score and the representative score may be equal to or higher than a predetermined value. The score in the case where (x1) is satisfied may be higher than the score in the case where (x2) is satisfied.

In the graph column permutation, for each graph row, the graph columns having the maximum aggregation score are moved upward, and the one or more moved graph columns are regarded as a fixed graph group. The condition satisfying graphs are expected to be adjacent to each other in the row direction in the unit of fixed graph column group.

In the graph column permutation, the graph row group is referred to sequentially from the upper graph row to the lower graph row, and the fixed graph column group is set for each graph row having been referred to. Before the graph column permutation, the graph row permutation is performed. According to the graph row permutation, the graph row having a high representative score is arranged upward. That is, the higher the representative score on the graph row to which the fixed graph column group corresponds is, the higher the group is arranged.

The graph row permutation is performed in unit of the graph row group. A first graph row group is a graph row group corresponding to the metric type of the effect destination resource, for example, the graph row group corresponding to the metric type of the base point resource, more specifically, for example, the graph row group corresponding to the metric type of the logical resource. A second graph row group is a graph row group corresponding to the metric type of the effect source resource, for example, the graph row group corresponding to the metric type of the related resource of the base point resource, more specifically, for example, the graph row group corresponding to the metric type of the physical resource. The graph column permutation is performed in unit of the graph row group. More specifically, for each graph row belonging to the first graph row group, the graph columns are aggregated upward (the graph column group is set), and in the aggregated range (in the range of the set graph column group), the graph column belonging to the second graph row group is arranged upward, for each graph row belonging to the second graph row group. That is, in each of ranges divided in view of the effect destination resource (e.g., the logical resource) and the effect source resource (e.g., the physical resource), the condition satisfying graphs are expected to be adjacent to each other along at least one of the row direction and the column direction.

Narrowing down of multiple candidate metric types to the display target metric types is effective in a case with limitation on the number of display target metric types such as in a case where "K or less metric types can be adopted as display targets for one resource type (K is a natural number)" (e.g., K=1).

Some embodiments have thus been described above. These embodiments are only examples for illustrating the present invention. There is no intention to limit the scope of the present invention only to these embodiments. The present invention can be implemented in other various forms.

For example, an interval may intervene between the graph rows that are adjacent to each other. An interval may intervene between the graph columns that are adjacent to each other.

For example, the base point resource may be associated with the row. The metric type may be associated with the column. In this case, the time axis may be the vertical axis, while the numerical value axis may be the horizontal axis.

REFERENCE SIGNS LIST

100: Computer system, 555: Management client, 557: Management server

The invention claimed is:

1. A non-transitory computer-readable storage medium storing a management program that is executed on a processor of at least one management computer, wherein the management computer is coupled to a computer system that includes multiple resources of multiple resource types, and wherein the management program is configured to cause the processor of the at least one management computer to execute the steps of:

collecting metric time series data of each of the resources;

storing the metric time series data of each of the resources in a storage resource;

receiving a selection of at least one of the resources;

determining two or more of the multiple resources that are base point resources and two or more respective related resources which are related to the base point resources based on multiple pieces of resource information stored in advance in the storage resource, related information of the multiple resources stored in advance in the storage resource, and the selected at least one of the resources;

obtaining the metric time series data in a predetermined time range of the base point resources and the related resources of the base point resource from the storage resource; and collectively performing display of a graph matrix which includes a plurality of two-dimensional orthogonal coordinate system graphs arranged in a plurality of columns and a plurality of rows and which separately display the obtained metric time series data of each of the respective base point resources and the obtained metric time series data of each of the related resources of each of the respective base point resources, and a horizontal axis is a time axis and a vertical axis is a metric value axis in each of the plurality of two-dimensional orthogonal coordinate system graphs, wherein each of the columns corresponds to a respective one of the base point resources and the related resources which are related to the respective one of the base point resources, and each of the rows corresponds to a same respective type of the obtained metric time series data.

2. The non-transitory computer-readable storage medium according to claim 1, wherein the obtained metric time series data is time series data for a plurality of different metric types selected for the resource types of the base point resources and the related resources.

3. The non-transitory computer-readable storage medium according to claim 2, wherein the management program is configured to cause the processor of the at least one management computer to further execute the step of adding metric types corresponding to one of the resource types in response to a user operation.

4. The non-transitory computer-readable storage medium according to claim 1, wherein the management program is configured to cause the processor of the at least one management computer to further execute the step of highlighting the two-dimensional orthogonal coordinate system graphs of the resources sharing an identical resource.

5. The non-transitory computer-readable storage medium according to claim 1, wherein the two or more multiple resources that are the base point resources are the resources corresponding to the selected at least one of the resources selected by a user from a resource list and the resources corresponding to a predetermined resource condition.

6. The non-transitory computer-readable storage medium according to claim 5, wherein the resources corresponding to the predetermined resource condition are resources corresponding to at least one of the following resources:

a resource belonging to an identical resource type;

a resource belonging to an identical layer;

a resource relating to an identical resource; and a resource residing in an identical enclosure.

7. The non-transitory computer-readable storage medium according to claim 1, wherein the management program is configured to cause the processor of the at least one management computer to further execute the step of narrowing down a display target in response to a user operation.

8. The non-transitory computer-readable storage medium according to claim 1, wherein the management program is configured to cause the processor of the at least one management computer to further execute the step of permuting displayed time series data in line units in response to a user operation.

9. The non-transitory computer-readable storage medium according to claim 1, wherein the management program is configured to cause the processor of the at least one management computer to further execute the step of permuting displayed time series data in column units in response to a user operation.

10. The non-transitory computer-readable storage medium according to claim 1, wherein the base point resources are logical resources belonging to an identical resource layer and the related resources of the base point resources include physical resources.

11. The non-transitory computer-readable storage medium according to claim 10, wherein the rows of the two-dimensional orthogonal coordinate system graphs which display the obtained time series metric data of the logical resources are disposed higher than the obtained time series data of the physical resources.

12. A management system, comprising:

at least one management computer coupled to a computer system that includes multiple resources of multiple resource types, wherein the at least one management computer is configured to execute the steps of:

collecting metric time series data of each of the resources;

storing the metric time series data of each of the resources in a storage resource;

receiving a selection of at least one of the resources;

determining two or more of the multiple resources that are base point resources and two or more respective related resources which are related to the base point resources based on multiple pieces of resource information stored in advance in the storage resource, related information of the multiple resources stored in advance in the storage resource, and the selected at least one of the resources;

obtaining the metric time series data in a predetermined time range of the base point resources and the related resources of the base point resource from the storage resource; and collectively performing display of a graph matrix which includes a plurality of two-dimensional orthogonal coordinate system graphs arranged in a plurality of columns and a plurality of rows and which separately display the obtained metric time series data of each of the respective base point resources and the obtained metric time series data of each of the related resources of each of the respective base point resources, and a horizontal axis is a time axis and a vertical axis is a metric value axis in each of the plurality of two-dimensional orthogonal coordinate system graphs, wherein each of the columns corresponds to a respective one of the base point resources and the related resources which are related to the respective one of the base point resources, and each of the rows corresponds to a same respective type of the obtained metric time series data.

* * * * *